United States Patent [19]

Shirakawa

[11] Patent Number: 5,617,831
[45] Date of Patent: Apr. 8, 1997

[54] DIESEL ENGINE STARTUP CONTROLLER

[75] Inventor: Takashi Shirakawa, Yokohama, Japan

[73] Assignee: Nissan Motor Co., Ltd., Kanagawa, Japan

[21] Appl. No.: 619,231

[22] Filed: Mar. 21, 1996

[30] Foreign Application Priority Data

Mar. 27, 1995 [JP] Japan .................................... 7-067284
Dec. 28, 1995 [JP] Japan .................................... 7-343992

[51] Int. Cl.$^6$ .................................................. F02M 37/04
[52] U.S. Cl. ........................................ 123/502; 123/179.17
[58] Field of Search .................................... 123/500, 501, 123/502, 179.16, 179.17, 491, 198 DB

[56] References Cited

U.S. PATENT DOCUMENTS 4,610,234  9/1986  Sakuranaka ...................... 123/179.17
4,638,782  1/1987  Yasuhara et al. ....................... 123/502
4,867,115  9/1989  Henein .............................. 123/179.17
5,138,999  8/1992  Tomsett ............................ 123/179.17
5,188,084  2/1993  Sekiguchi ............................ 123/502

FOREIGN PATENT DOCUMENTS

4323967A1  1/1994  Germany .
59-147831  8/1984  Japan .

*Primary Examiner*—Thomas N. Moulis
*Attorney, Agent, or Firm*—Lowe, Price, LeBlanc & Becker

[57] ABSTRACT

Fuel injection is prevented until an injection timing of a fuel injection device detected during cranking of a diesel engine, is identical to a target injection timing. Preferably, the fuel injection timing is advanced during the prevention period according to fuel properties. In this way, startup time is shortened, and toxic components contained in exhaust gas are reduced during startup.

12 Claims, 23 Drawing Sheets

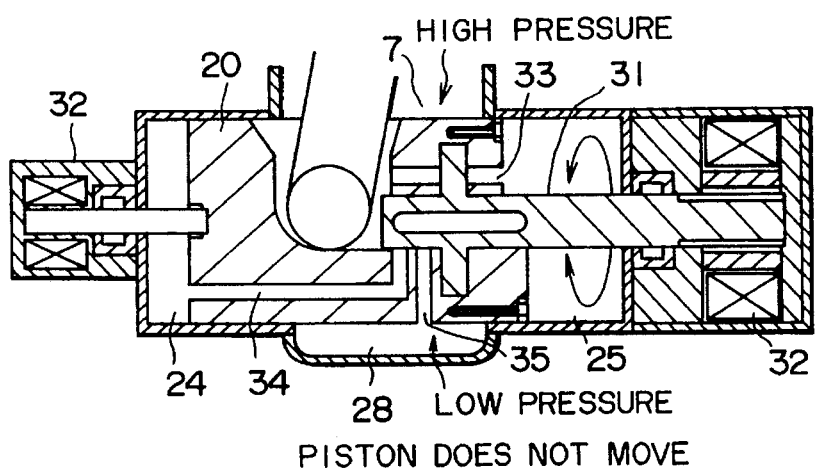
FIG. 11A — PISTON DOES NOT MOVE
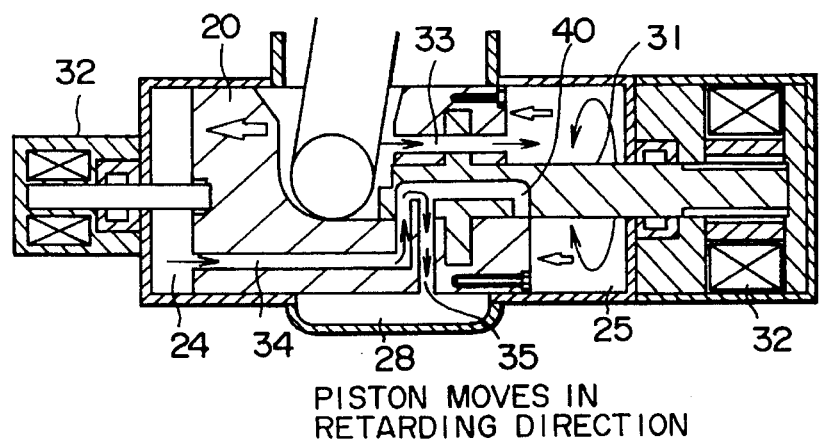
FIG. 11B — PISTON MOVES IN RETARDING DIRECTION
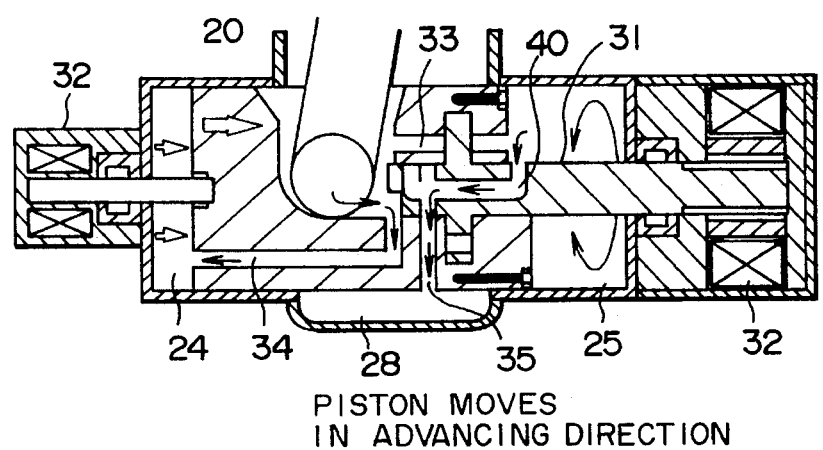
FIG. 11C — PISTON MOVES IN ADVANCING DIRECTION

FIG. 19A PLUNGER STROKE
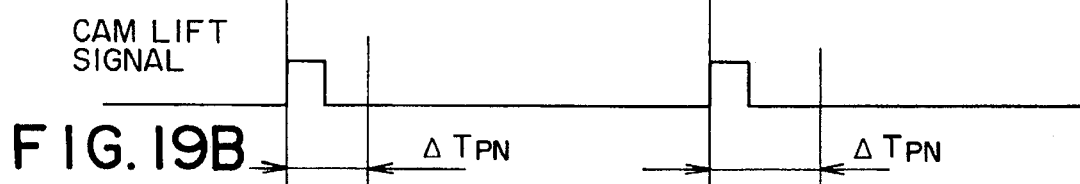
FIG. 19B CAM LIFT SIGNAL $\Delta T_{PN}$
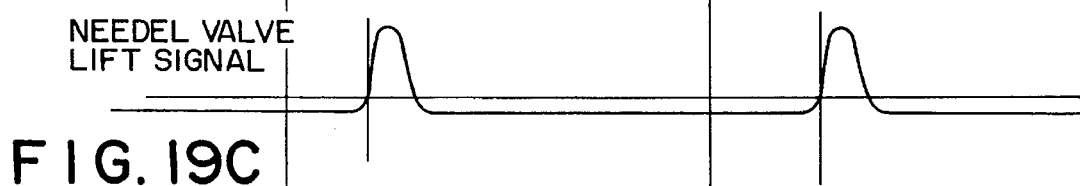
FIG. 19C NEEDEL VALVE LIFT SIGNAL
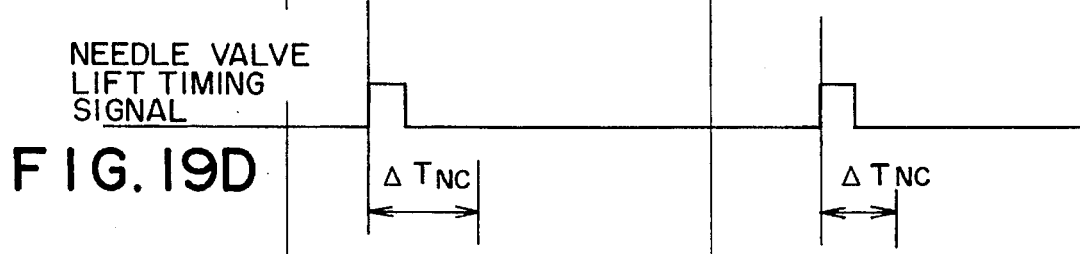
FIG. 19D NEEDLE VALVE LIFT TIMING SIGNAL $\Delta T_{NC}$
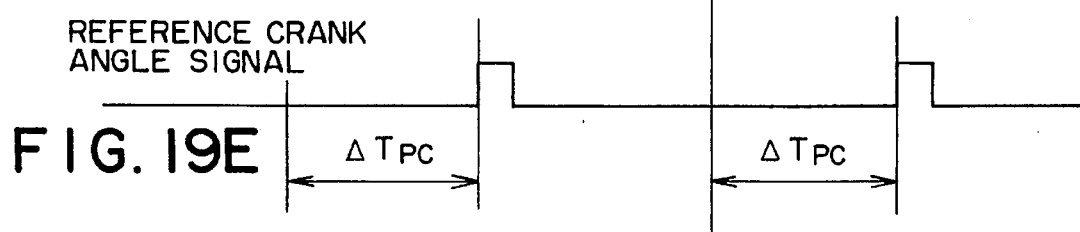
FIG. 19E REFERENCE CRANK ANGLE SIGNAL $\Delta T_{PC}$

DIESEL ENGINE STARTUP CONTROLLER

FIELD OF THE INVENTION

This invention relates to fuel injection control during startup of a diesel engine.

BACKGROUND OF THE INVENTION

In a diesel engine, fuel injected into intake air is self-ignited due to compression of the air, however when the engine is start up cold, the temperature of the intake air may not rise to the point of self-ignition of the fuel. To deal with this problem, a glow plug may be installed in the engine combustion chamber and the air heated directly, or part of the exhaust gas may be recycled into the intake system so as to raise the temperature of the intake air.

Tokkai Sho 59-147831 published by the Japanese Patent Office in 1984 discloses a startup controller wherein fuel injection is not performed for a certain period after engine cranking has started. This is because when fuel is injected when the combustion chamber has not reached the self-ignition point, the injected fuel lowers the chamber temperature, and unburnt gas or incompletely burnt gas is ejected into the atmosphere.

In order to accelerate engine startup, an essential prerequisite is to suitably control the fuel injection timing. The temperature of the combustion chamber increases after the piston has repeatedly compressed the intake air, the temperature at top dead center first reaching a sufficiently high level for ignition to occur. To accelerate engine startup, therefore, the fuel injection timing must be controlled so that ignition occurs in the vicinity of top dead center, and for this purpose, the injection timing must be advanced considering the delay that exists between injection and ignition, i.e. the ignition delay period.

In a mechanical fuel injection pump, this fine setting of the injection period is difficult, because the injection timing follows contraction and expansion of wax according to the cooling water temperature in this type of pump.

In a fuel injection pump wherein the injection timing follows the oil pressure via a timer piston, the timer piston is generally biased toward the retardation side by a spring and advanced by the off pressure against the force of the spring. In this case, the oil pressure rises in proportion to the pump revolution speed, but it is difficult to obtain sufficient pressure when the engine is cold, because the cranking speed of the engine is also low when it is cold. Further, as the fuel injection amount is increased during startup, the reaction due to driving the pump increases. Hence, even in an electronic fuel injection pump, it is difficult to freely vary the injection timing during cold startup.

During cold startup, therefore, some time is required for the desired injection advance angle to be obtained. However, if the fuel injection timing is not appropriate, a certain time will be required from the start of fuel injection to good ignition and a full combustion even when fuel injection is not performed for a certain time after cranking begins, as described in the aforesaid prior art example. During this time, the temperature of the combustion chamber falls due to vaporization of the injected fuel, and that makes it increasingly difficult to shorten startup time. In addition, emissions of toxic components of incomplete combustion increase.

SUMMARY OF THE INVENTION

It is therefore an object of this invention to obtain a suitable self-ignition and a full combustion at an early time during cold startup of a diesel engine.

It is a further object of this invention to improve the response of advance control of fuel injection timing during cold startup of the diesel engine.

It is still a further object of this invention to ensure engine startup even in the unlikely event that a suitable injection timing is not obtained.

In order to achieve the above objects, this invention provides a startup controller for such a diesel engine that has a cranking mechanism to start the engine, a mechanism for injecting fuel into a combustion chamber of the engine, a mechanism for detecting an engine running condition, a mechanism for determining a fuel injection target timing of the injecting mechanism based on the engine running condition, and a mechanism for controlling a fuel injection timing of the fuel injection mechanism to the fuel injection target timing.

The startup controller is characterized in that it has a mechanism for detecting an injecting action of the injecting mechanism, and a mechanism preventing fuel injection by the injecting means after engine cranking by cranking mechanism until the detected timing of the injecting action becomes identical to the fuel injection target timing.

It is preferable that the injecting mechanism comprises a pump for pressurizing fuel, the pump comprises a pressurizing chamber for pressurizing fuel and a cut-off valve which blocks a fuel supply passage to the pressurizing chamber, and the preventing mechanism comprises a mechanism for shutting the blocking valve.

It is also preferable that the injecting mechanism comprises a pump for pressurizing fuel, the pump comprises a pressurizing chamber for pressurizing fuel and a mechanism for relieving the pressure of the pressurizing chamber, and the preventing mechanism comprises a mechanism for operating the relieving mechanism to relieve the pressure of the pressurizing chamber.

It is also preferable that the preventing mechanism comprises a mechanism for permitting fuel injection by the injection mechanism when the fuel injection timing does not become identical to the target timing within a predetermined period.

It is also preferable that the control mechanism comprises a mechanism for advancing an injection timing during the period when fuel injection is prevented by the preventing mechanism.

This advancing mechanism preferably comprises two oil chambers and a control member which displaces according to a pressure balance between the oil chambers, and the injection timing is advanced according to the position of the control member.

In this case, the injecting action detecting mechanism preferably comprises a mechanism for detecting the position of the control member.

In this case, it is further preferable that the injecting mechanism preferably comprises a fuel injection valve which lifts according to a fuel pressure, the injection action detecting mechanism further comprises a mechanism for detecting a lift of the fuel injection valve, and the control mechanism controls the pressure of the oil chambers such that the lift timing of the fuel injection valve is identical to a target lift timing of the fuel injection valve found from the target injection timing when a fuel injection amount is equal to or greater than a predetermined value.

It is further preferable that the control mechanism comprises a mechanism for calculating a difference between a lift detection timing of the fuel injection valve and the injecting action detecting timing when the fuel injection amount is equal to or greater than a predetermined value, and correcting an advance amount of the injection timing due to the advancing mechanism based on the difference.

It is also preferable that the injecting mechanism comprises a fuel injection pump which pressurizes fuel by a lift of a cam in synchronism with a rotation of the engine, and the injecting action detecting mechanism comprises a mechanism for detecting the lift of the cam.

Also in this case, it is further preferable that the injecting mechanism comprises a fuel injection valve which lifts according to a fuel pressure, the injecting action detecting mechanism further comprises a mechanism for detecting a lift of the fuel injection valve, and the control mechanism controls the position of the control member such that the lift timing of the fuel injection valve is identical to a target lift timing of the fuel injection valve found from the target injection timing when the fuel injection amount is equal to or greater than a predetermined value.

Also in this case, it is further preferable that the control mechanism comprises a mechanism for calculating a difference between the lift detection timing of the fuel injection valve and the lift detection timing of the cam when the fuel injection amount is equal to or greater than a predetermined amount, and corrects the advance amount of the injection timing due to the advancing mechanism based on the difference.

The details as well as other features and advantages of this invention are set forth in the remainder of the specification and are shown in the accompanying drawings.

BRIEF DESCRIPTION OF THE DRAWINGS

FIGS. 11A–11C are sectional views of a drive mechanism of a timer piston according to a fourth embodiment of this invention.

FIGS. 19A–19E are diagrams showing output timings of various signals according to the sixth embodiment of this invention.

DESCRIPTION OF THE PREFERRED EMBODIMENTS

Figure 1:
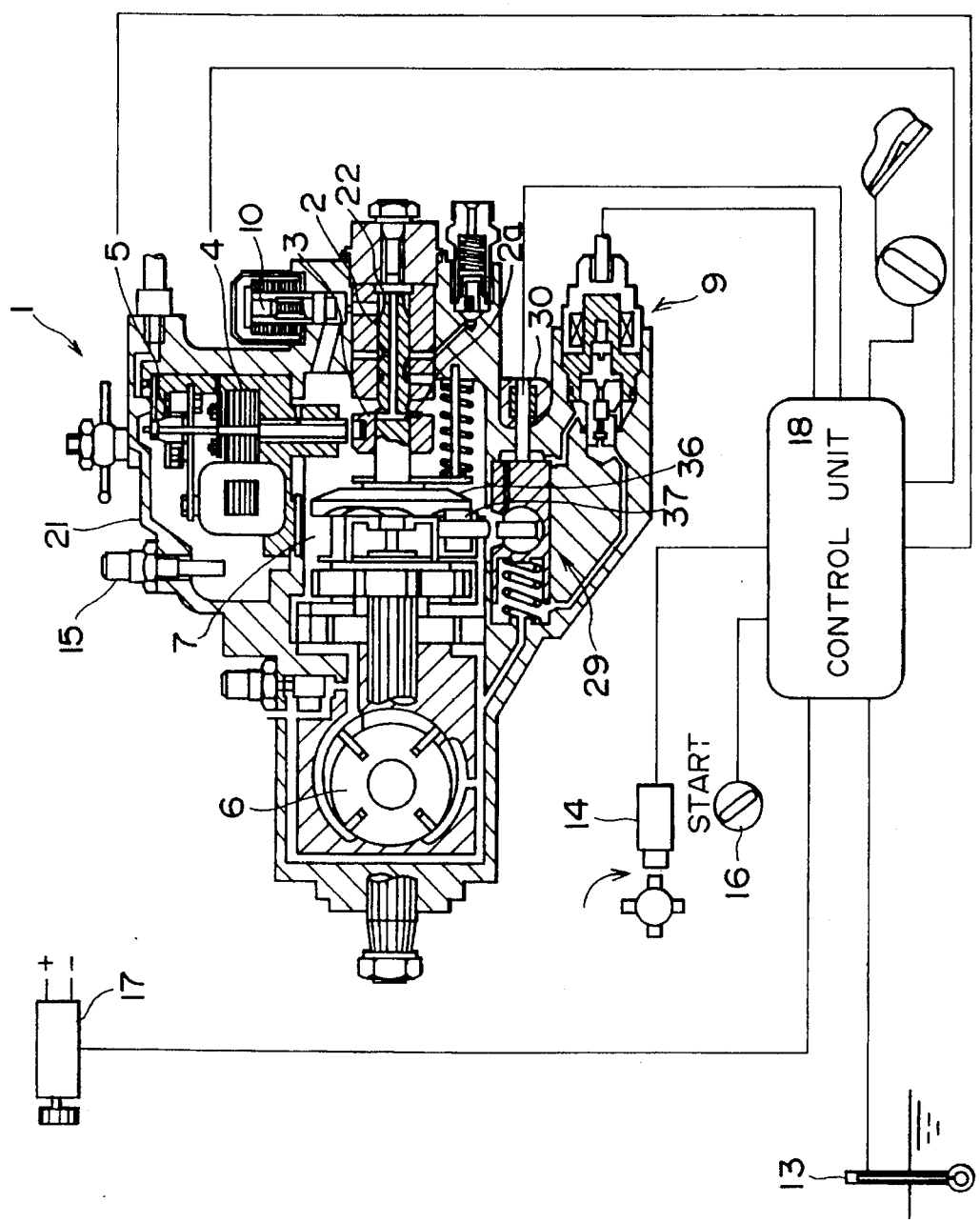
FIG. 1 is a schematic diagram of a startup controller according to this invention.

Referring to FIG. 1 of the drawings, a distributor type pump 1 used in a vehicle diesel engine aspirates fuel into a pressurizing chamber 22 by the axial displacement of plunger 2 in a housing 21. Pressurized fuel is supplied to fuel injection nozzles provided in each cylinder of the engine in a predetermined sequence according to the rotational displacement of the plunger 2. A cam plate 36 is fixed to the base end of the plunger 2, the plunger 2 being moved in axial and rotational directions when this cam plate 36 rotates over a roller 37 in the housing 21.

A control sleeve 3 slides on the outer circumference of the plunger 2. The control sleeve 3 increases or decreases the fuel injection amount supplied to the nozzles by opening and closing a cutoff port 2a according to its own displacement position.

The basic construction of the fuel injection pump described hereinabove is disclosed for example in DE 43 23 967 A1 published on Jan. 20, 1994 by the German Patent Office.

The control sleeve 3 displaces according to the energization of a rotary solenoid 4. The displacement position of the sleeve 3 is detected by a sleeve position sensor 5. As the fuel injection amount varies according to the position of this sleeve 3, the fuel injection amount may be detected by detecting this position.

Fuel aspirated to the pressurizing chamber 22 is supplied from a feed pump 6 via a pump chamber 7 according to the displacement of the plunger 2. A fuel cut valve 10 is interposed in the fuel passage leading from the pump chamber 7 to the pressurizing chamber 22.

Figure 2:
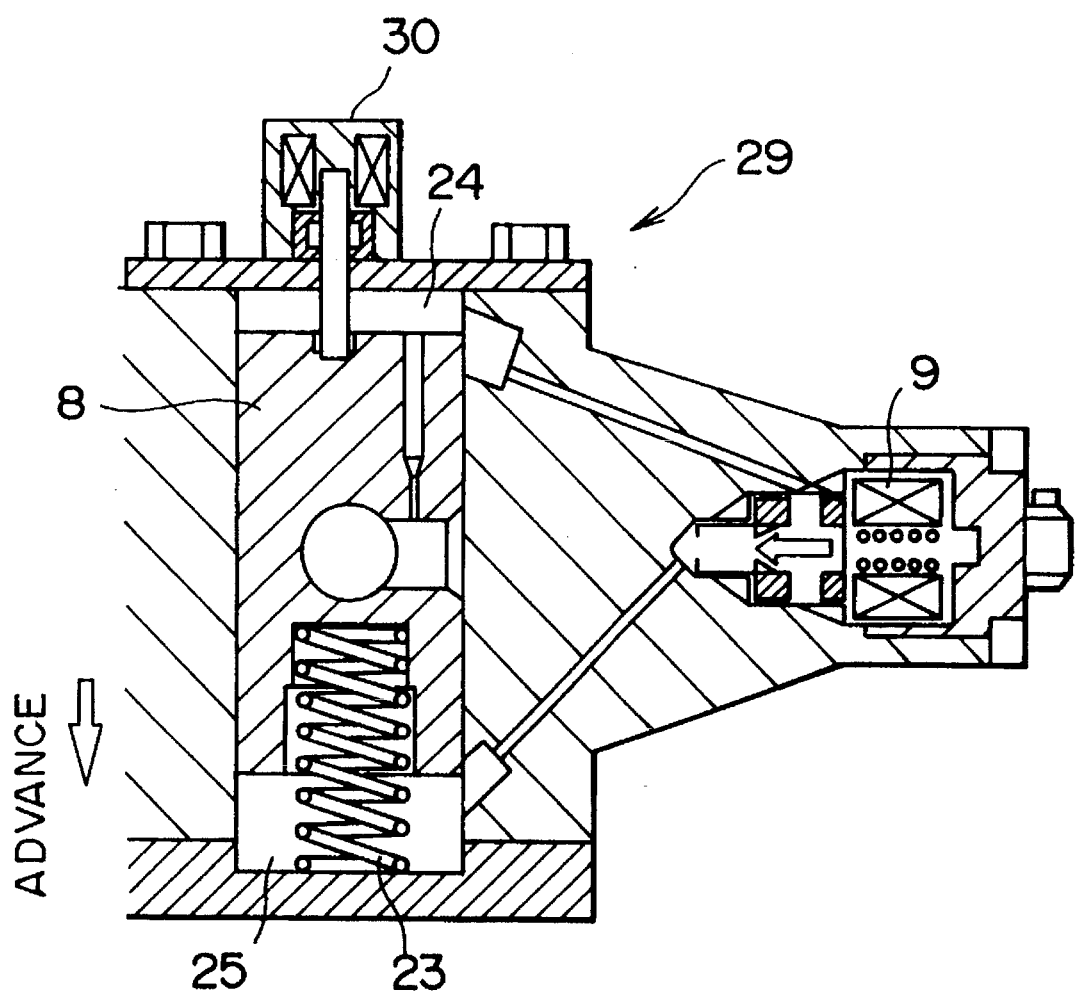
FIG. 2 is an enlarged sectional view of a drive mechanism of a timer piston according to this invention.

The fuel injection timing of the nozzles varies according to the support position of the roller 37 in contact with the cam plate 36. The position of the roller 37 is controlled by an injection timing adjustment mechanism 29 shown in FIG. 2.

The injection timing adjustment mechanism 29 comprises a timer piston 8 which varies the support position of the roller 37 via a lever. The timer piston 8 is pushed by a spring 23 in a direction such as to retard the injection timing, the pressure difference between an advancing pressure chamber 24 and retarding pressure chamber 25 facing the ends of the timer piston 8 being maintained in equilibrium with the pressure of the spring 23. The pressure of the pump chamber 7 is led to the advancing pressure chamber 24. The retarding pressure chamber 25 is connected to the aspiration side of the feed pump 6.

The chambers 24 and 25 are connected to each other via a timing control valve 9. A piston position sensor 30 is installed in the housing 21 so as to detect the displacement of the timer piston 8. The fuel injection timing varies according to the displacement position of the timer piston 8, so the real fuel injection timing is detected by the piston displacement sensor 30.

A water temperature sensor 13 for detecting engine cooling water temperature, rotation speed sensor 14 for detecting engine rotation speed, fuel temperature sensor 15 for detecting fuel temperature and starter switch 16 for inputting an engine startup command are further provided for detecting engine running conditions. The starter switch 16 is a switch that energizes a starter motor 17 which cranks the engine.

Signals output by the aforesaid sensors are input to a control unit 18 comprising a microprocessor. From these input signals, the control unit 18 controls the fuel injection amount and timing via the rotary solenoid 4, timing control valve 9 and fuel cut valve 10.

Figure 3:
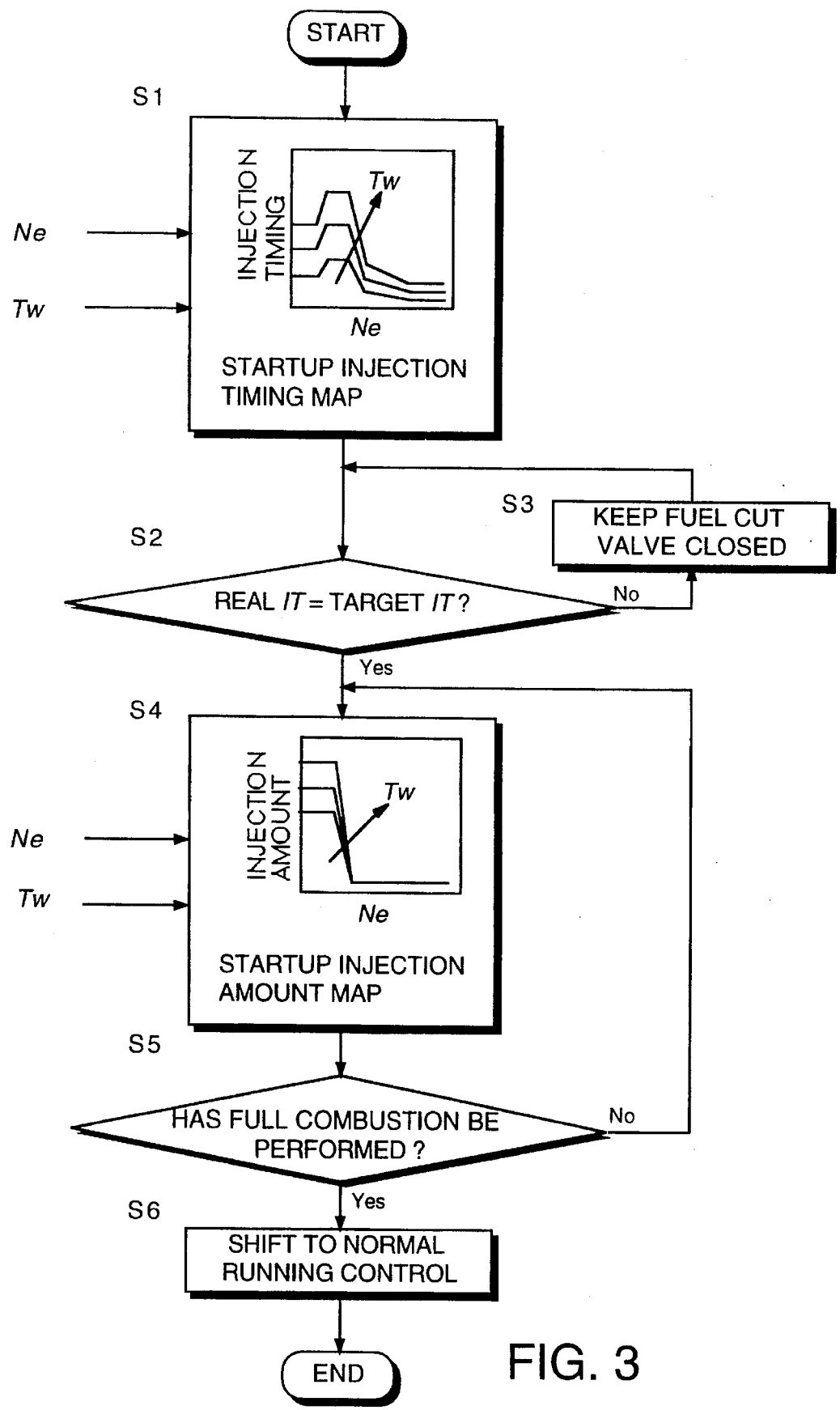
FIG. 3 is a flowchart showing a basic process of fuel injection control during startup according to this invention.

During startup, the fuel injection timing is controlled according to a routine shown in FIG. 3. This routine begins when the driver operates the starter switch 16 so as to input a startup command. When the starter switch 16 is turned on, the starter motor 17 begins engine cranking while the fuel cut valve 10 is still closed. As the fuel cut valve 10 is closed, fuel is not supplied from the fuel injection pump 1 to the fuel injection nozzles, however the timing of the injection action of the plunger 2 is detected from the signal output by the piston position sensor 30 just as if fuel injection actually occurred (referred to hereinafter as real fuel injection timing).

In a step S1, a target injection timing is searched from a startup injection timing map based on an engine rotation speed No and water temperature Tw. This map is prestored in a memory of the control unit 18, the setting being such as to advance the fuel injection timing more the lower the rotation speed Ne and water temperature Tw.

In a step S2, the real injection timing detected by the piston position sensor 30 and the target injection timing searched in the step S1 are compared. When the difference between these two is greater than a predetermined value, cranking is continued with the fuel cut valve 10 still closed in a step S3. When the difference is less than the predetermined value it is determined that the two are substantially identical, and the routine proceeds to a step S4. In this way, cranking is continued with the fuel cut valve 10 still closed until the real injection timing and target injection timing are substantially identical.

In the step S4, a target fuel injection amount is determined based on a startup fuel injection amount map from the engine rotation speed Ne and water temperature Tw. The fuel cut valve 10 is then opened and fuel injection takes place.

In a step S5, the variation of the engine rotation speed Ne is monitored, and it is determined whether or not there has been a full combustion by determining whether or not the rotation speed Ne has risen by at least a predetermined amplitude. When it is determined that there has been a full combustion, startup fuel injection control is terminated, and the routine shifts to normal running fuel injection control in a step S6.

After cranking begins, when the real fuel injection timing is not identical to the target fuel injection timing, fuel is not ignited satisfactorily even if it is injected, and the temperature of the combustion chamber falls due to vaporization of injected fuel. By closing the fuel cut valve 10 so that fuel is not injected at such times, the startup period is shortened and emission of toxic components due to unburnt gas is prevented as shown in FIGS. 6A–6D.

As the fuel in the pump chamber 7 does not decrease when fuel injection stops, the pressure of the chamber 7 rises due to the feed pump 6. The pressure of the advancing pressure chamber 24 to which the pressure of the chamber 7 is led therefore also rises soon after startup, and the time required for the real injection timing and target injection timing to become identical is shortened.

Figure 4:
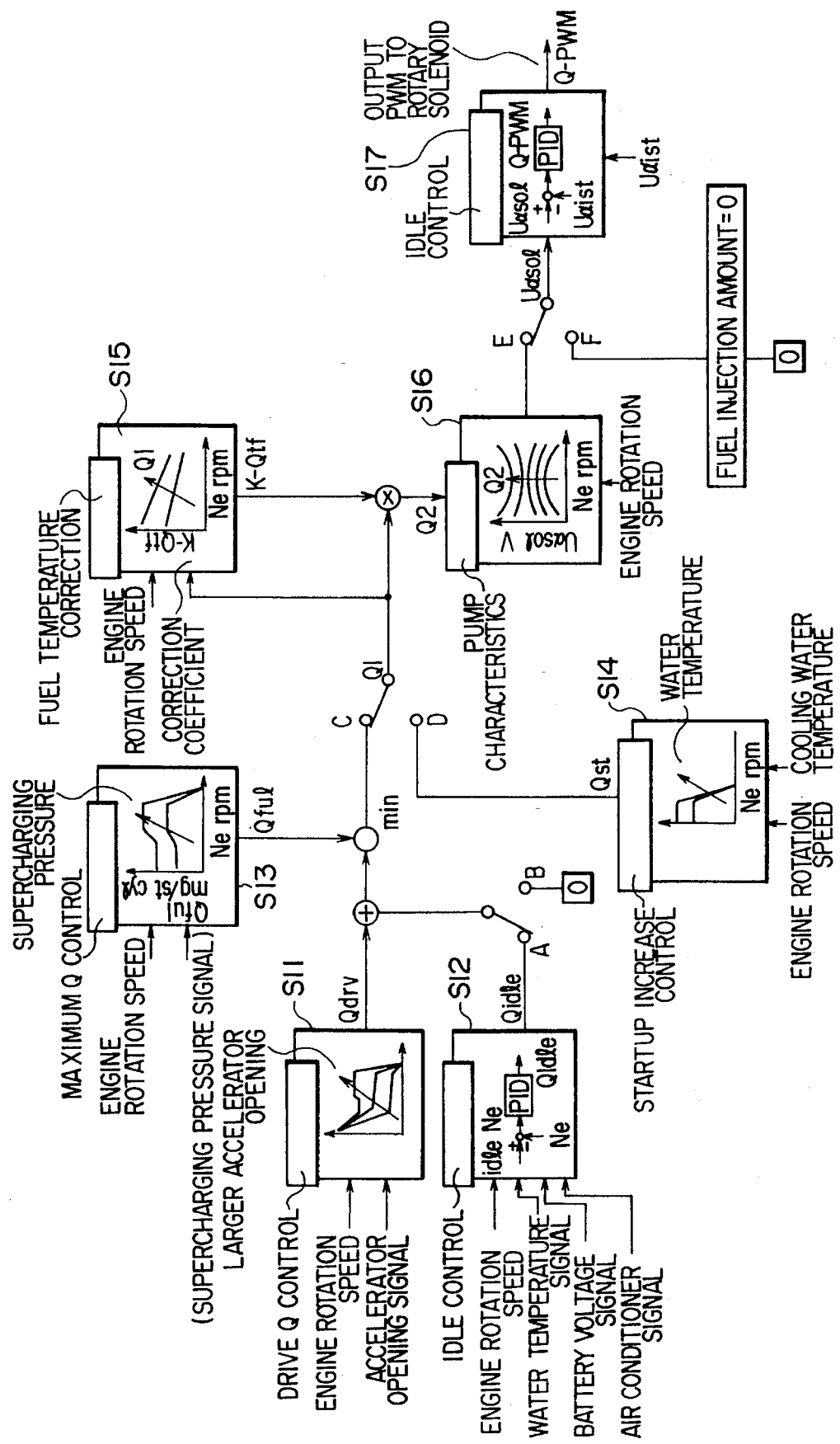
FIG. 4 is a block diagram showing a control process of a fuel injection amount according to this invention.

The fuel injection amount is controlled according to the block diagram shown in FIG. 4.

During normal running, a target fuel injection amount is set by characteristics (referred to hereinafter as drive Q characteristics) depending on the engine rotation speed Ne and water temperature Tw (step S11).

During idle running, in addition to control by drive Q characteristics, a target engine rotation speed and real engine rotation speed are compared, and the target fuel injection amount is increased or decreased by a proportional integral difference (PID) according to the difference between these two speeds (step S12).

Further, a maximum injection is limited, with the water temperature Tw or oversupply pressure in the case of a turbo vehicle as parameters, relative to the drive Q characteristics set under standard running conditions (step S13).

When the engine is started, the target fuel injection amount is determined by a startup increase set according to the engine rotation speed Ne and water temperature Tw (step S14).

As the fuel injection amount at one control sleeve position varies for example according to the fuel temperature detected by the fuel temperature sensor 15, a correction based on the fuel temperature is added to the target fuel amount determined in the steps S11–S14 (step S15).

The relation between the control sleeve position and fuel injection amount is also closely studied from a pump characteristic map which has been prestored, and a target control sleeve position corresponding to the target fuel amount is determined (step S16).

This target control sleeve position and the control sleeve position based on the signal output by the sleeve position sensor 5 are compared, and a control sleeve shift amount is determined by PID processing. An energizing signal is then output to the rotary solenoid 4 so that the determined shift amount is implemented (step S17).

Figure 5:
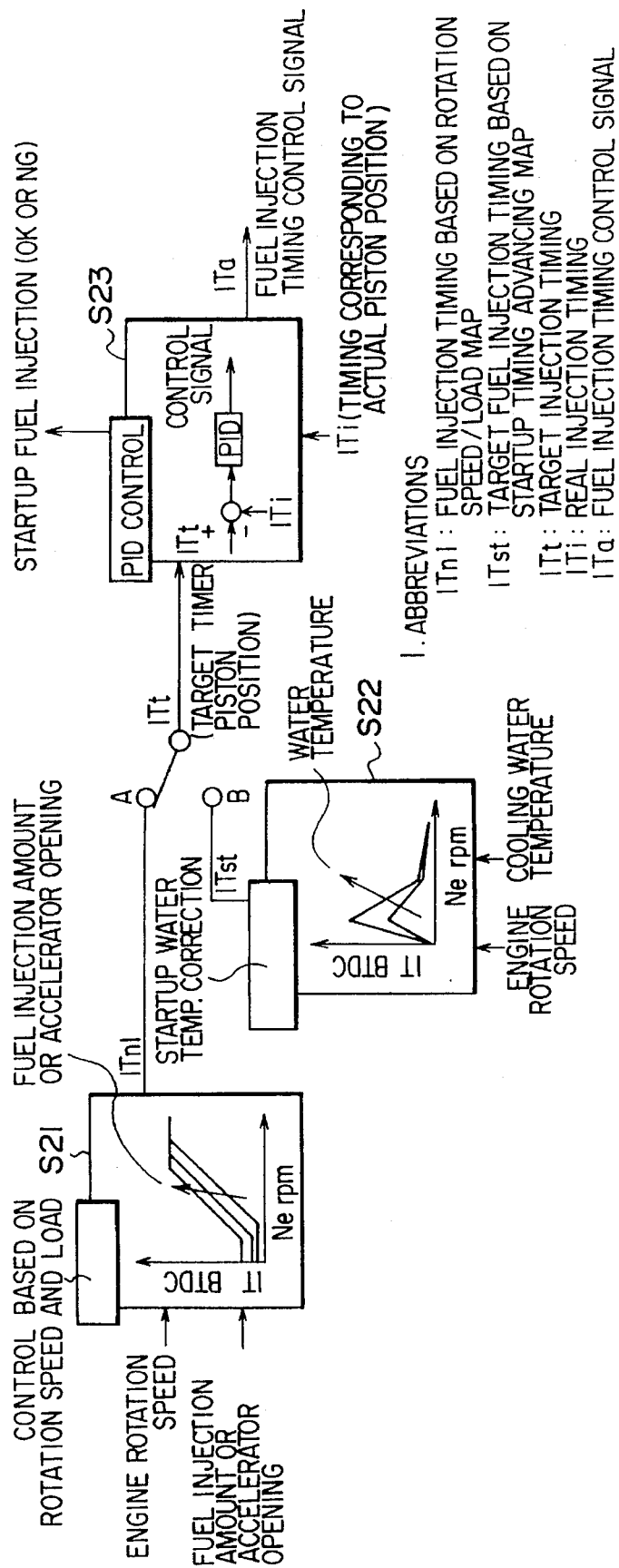
FIG. 5 is a block diagram showing a control process of a fuel injection timing according to this invention.
Figure 6A:
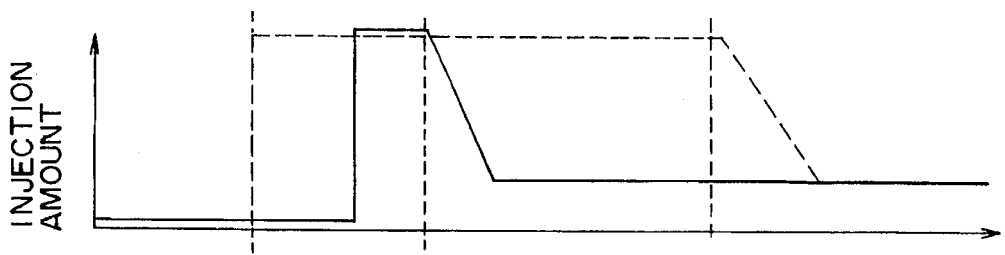
FIGS. 6A–6D are diagrams of fuel injection amount, pump chamber pressure, injection timing and HC emission amount using a startup controller according to this invention as compared to the prior art.
Figure 6B:
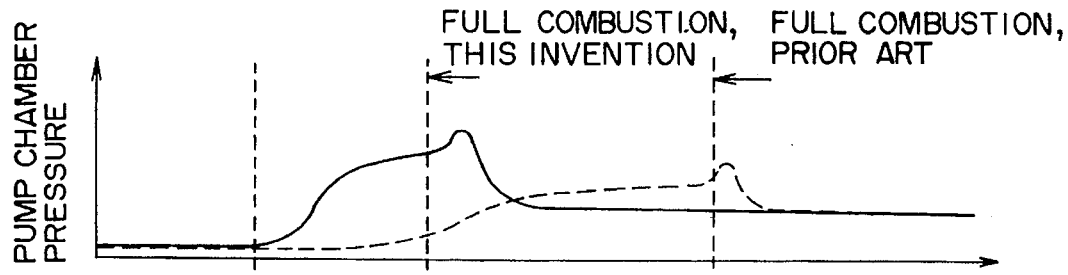
Figure 6C:
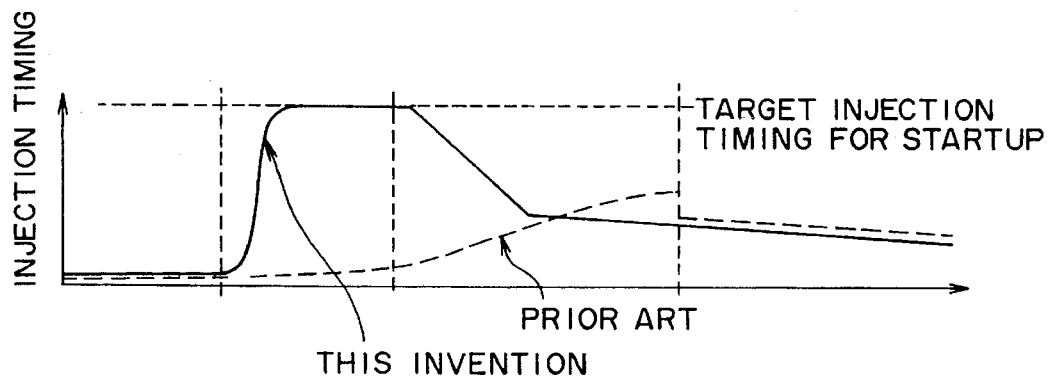
Figure 6D:
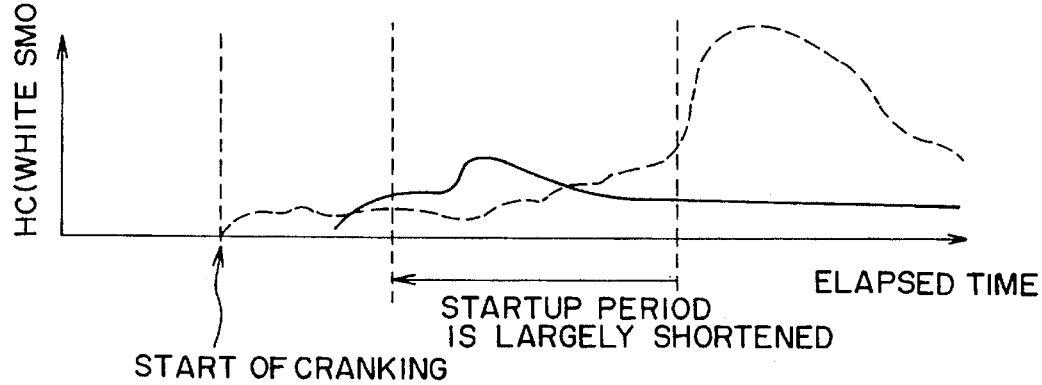

The fuel injection timing is controlled according to the block diagram shown in FIG. 5.

The target fuel injection timing is determined according to the engine rotation speed Ne, and the engine load expressed by the fuel injection amount or accelerator depression (step S21).

During engine startup, the target injection timing is determined based on startup injection timing advance characteristics set according to the engine rotation speed Ne and water temperature Tw (step S22).

Next, the set target injection timing and real injection timing detected by the piston position sensor 30 are compared, and a timer piston shift amount is found by PID control. An actuator command signal specifying a valve duty is then output to the timing control valve 9 so that this timer piston shift amount is implemented (step S23).

According to this construction, a pump feed start timing can be calculated from the following relation by detecting the timer piston position:

Pump feed start timing (BTDC) = constant × timer piston position (mm) + pump set angle (BTDC)

The pump set angle (BTDC) is a value showing whether a reference position of the timer piston is within a given number of degrees ahead of top dead center (TDC) of an engine reference cylinder.

The timer piston position when this pump feed start timing (BTDC) is identical to the target injection timing, is the target timer piston position. The fuel injection timing is controlled by feedback control so as to approach this target timer piston position.

Figure 7:
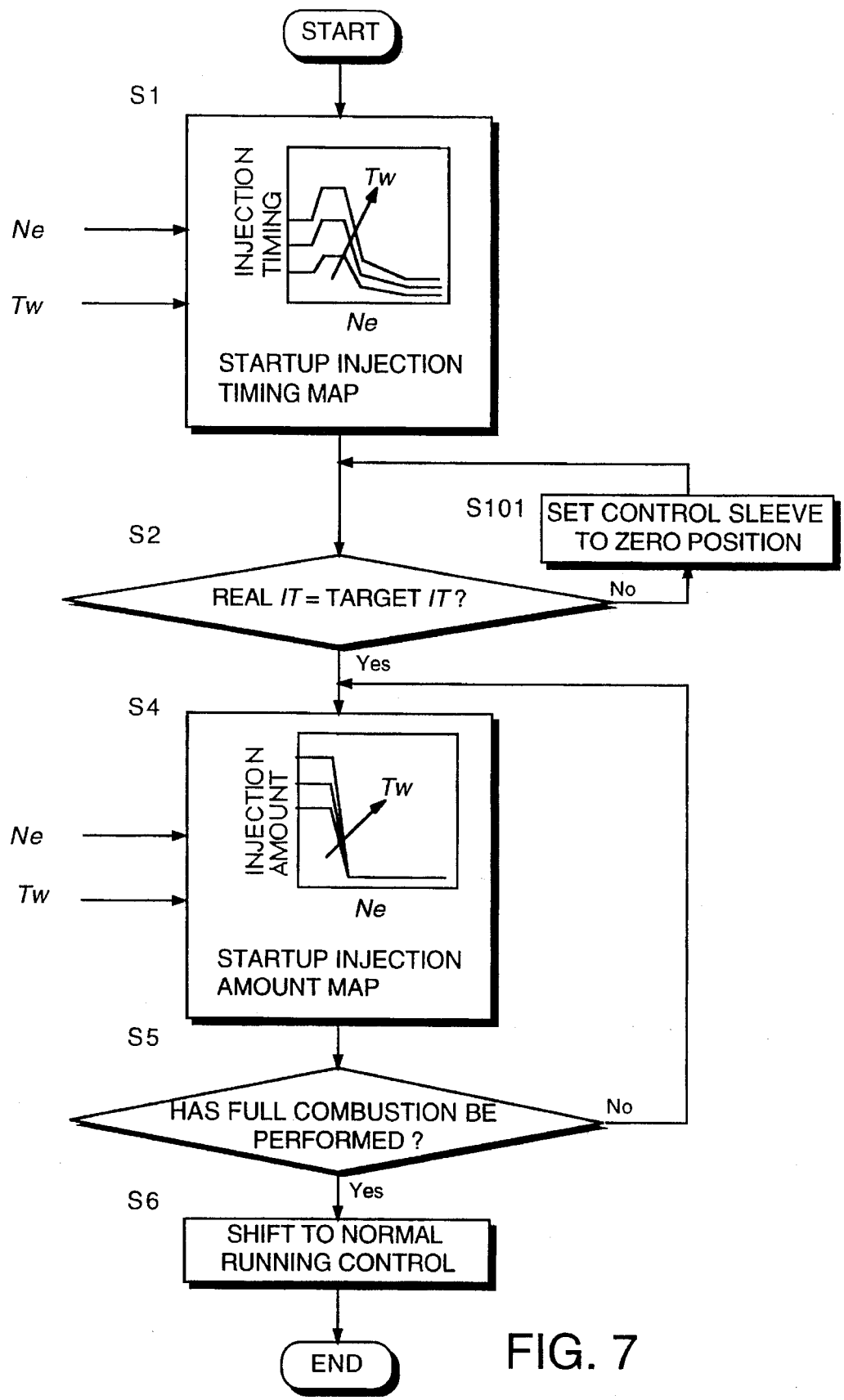
FIG. 7 is similar to FIG. 3, but showing a second embodiment of this invention.
Figure 8:
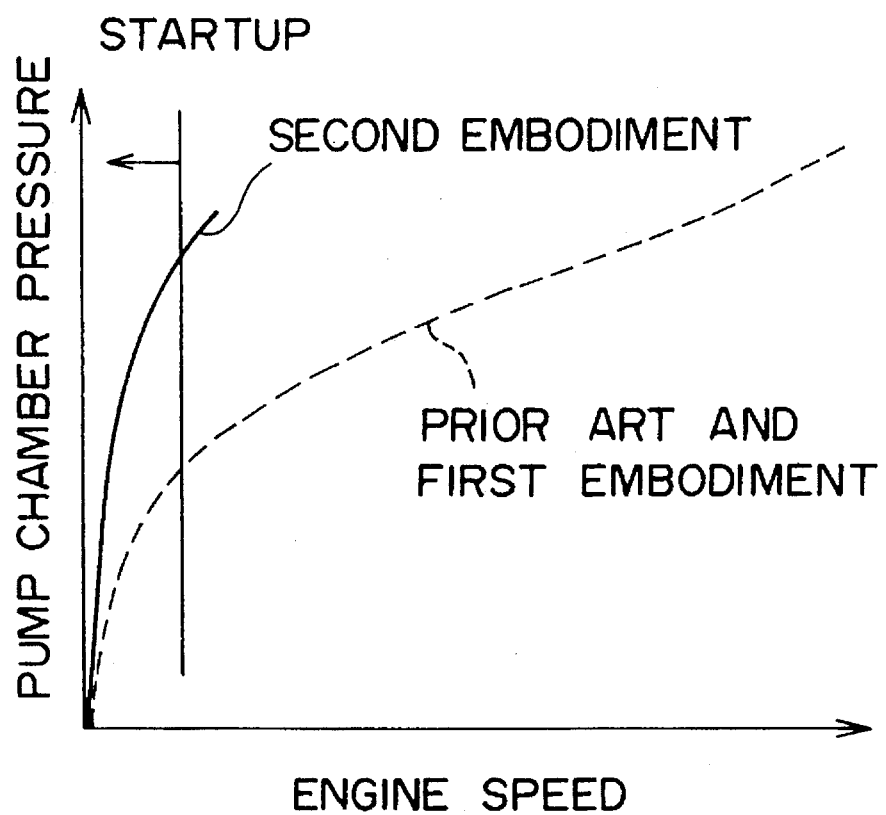
FIG. 8 is a graph showing a variation of pump chamber pressure according to the second embodiment of this invention.

FIGS. 7 and 8 show a second embodiment of this invention.

Here, instead of the step S3 of the aforesaid embodiment 1, a step 101 is provided. In the step S101, the position of the control sleeve 3 is controlled via a rotary solenoid 4 so that the cutoff port 2a is already open when fuel begins to be fed by the plunger 2. The fuel aspirated to the chamber 22 by the aspirating action of the plunger 2 is recycled to the pump chamber 6 from the cutoff port 2a without being pressurized by the pressurizing action of the plunger 2.

In the first embodiment or the prior art shown by the dotted line in FIG. 8, as the fuel cut valve 10 cuts fuel supply to the pressurizing chamber 22, the pressurizing chamber 22 is put under negative pressure by the aspirating action of the plunger 2, and the negative load on the starter motor 17 which drives the fuel injection pump 1, increases.

According to this embodiment, when fuel injection is stopped due to the control sleeve 3, there is no increase of negative load so the drive resistance of the fuel injection pump 1 decreases. The pressure in the pump chamber 7 therefore rapidly rises as shown in FIG. 8, and control of injection timing to the target injection timing is speeded up.

In an electronically controlled fuel injection pump using a variable control sleeve, the method of preventing fuel injection used in this embodiment is easy to apply. However, if this method is applied to a mechanically controlled pump, it is necessary to add an actuator to move the control sleeve.

Figure 9:
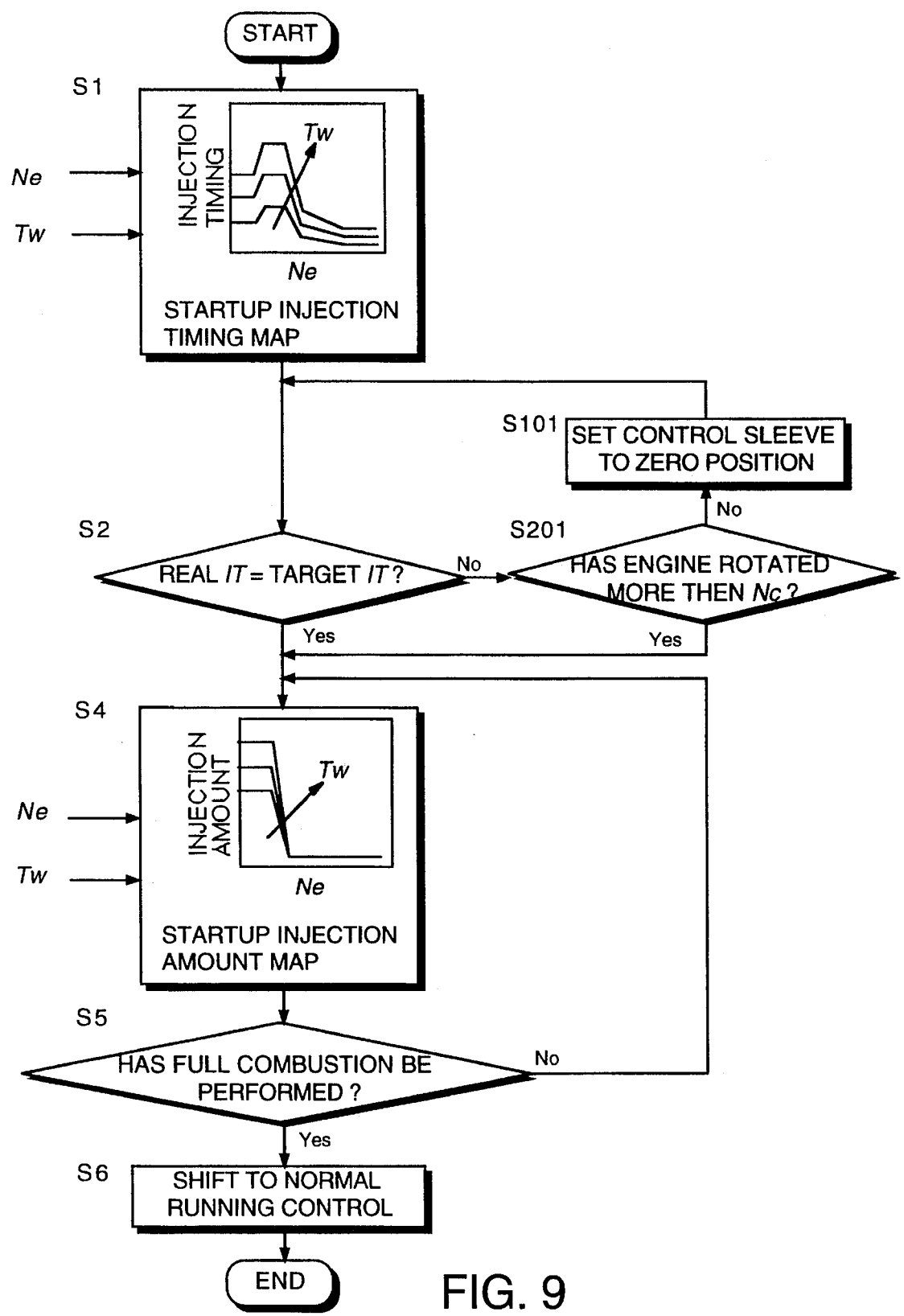
FIG. 9 is similar to FIG. 3, but showing a third embodiment of this invention.
Figure 10:
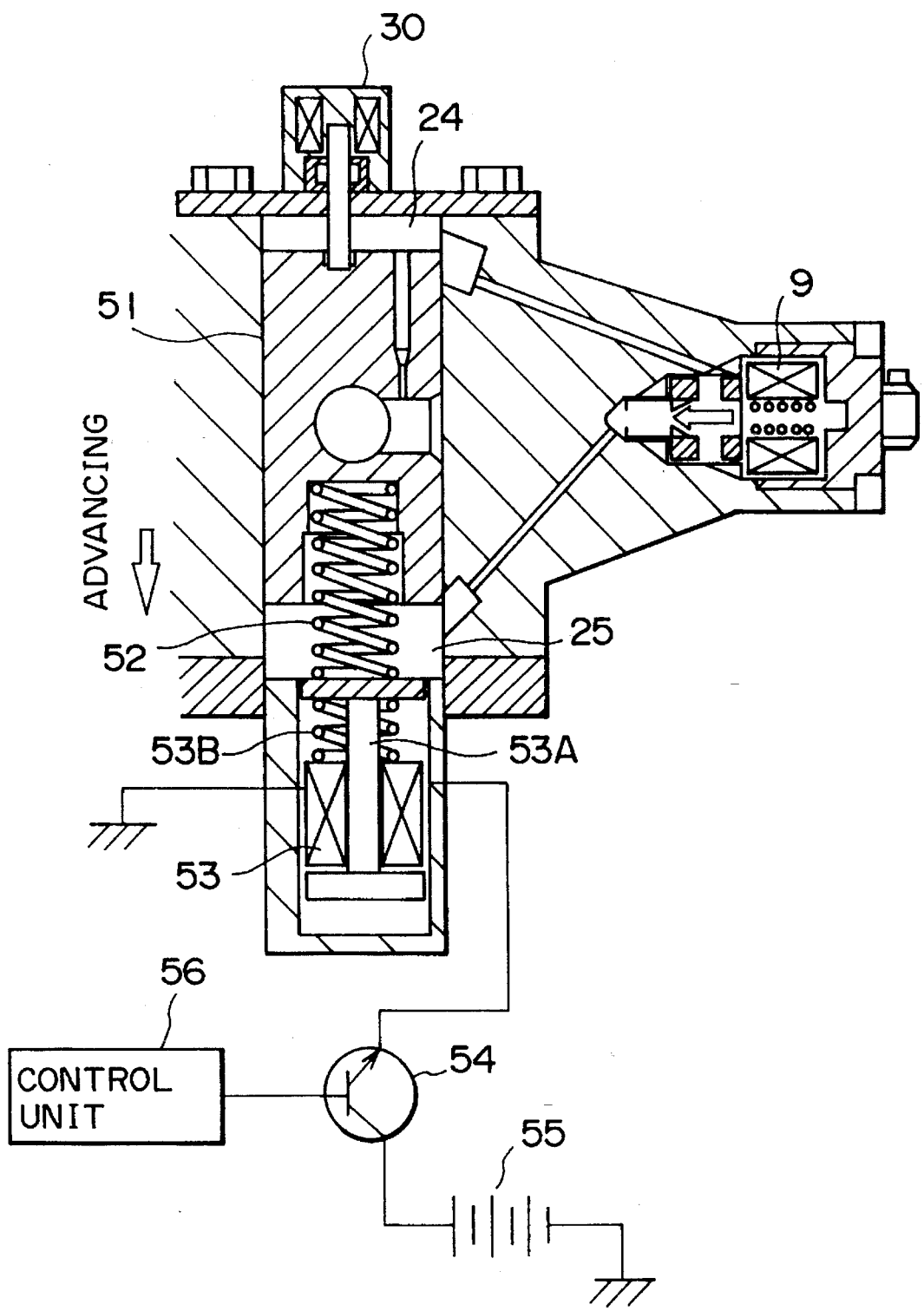
FIG. 10 is a sectional view of a drive mechanism of a timer piston according to the third embodiment of this invention.
Figure 12:
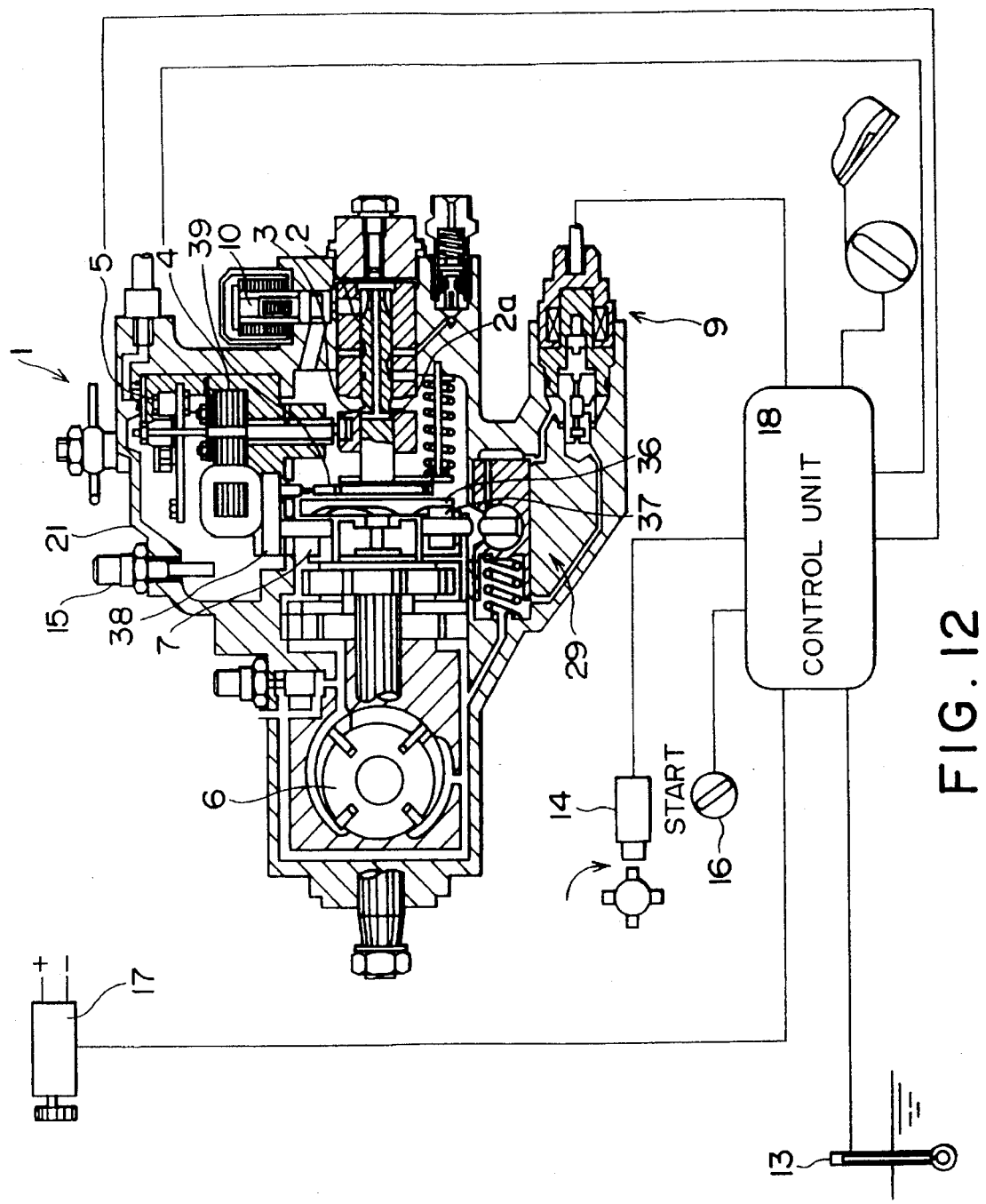
FIG. 12 is similar to FIG. 1, but showing a fifth embodiment of this invention.
Figure 13:
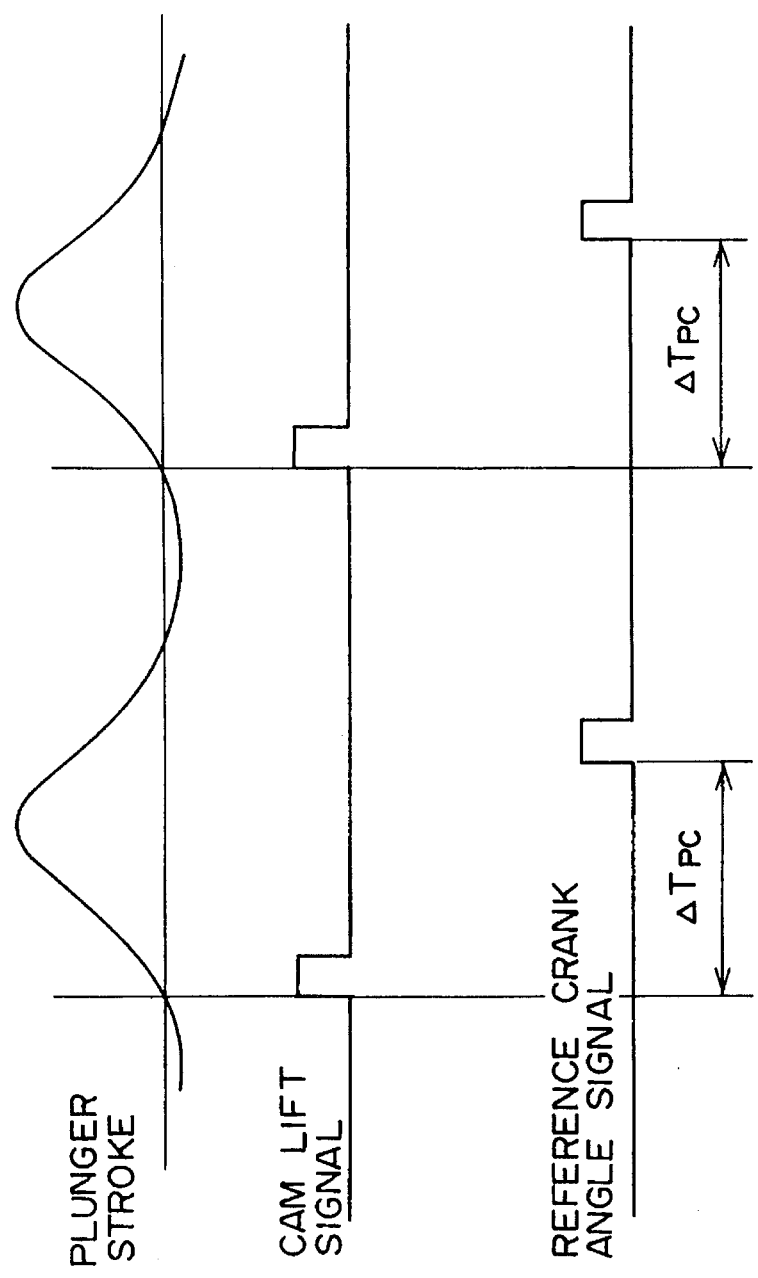
FIGS. 13A–13C are diagrams describing a time difference $\Delta T_{PC}$(msec) according to the fifth embodiment of this invention.

FIGS. 9 and 10 show a third embodiment of this invention.

In this case, steps S201 and S202 are provided instead of the aforesaid step S3.

In the step S201, it is determined if the engine has rotated a predetermined value of times Nc, and fuel injection begins if this condition is satisfied.

For example, at very low temperature, it may occur that the real injection timing is not identical to the target injection timing even if a predetermined number Nc of crankings are performed due to fuel waxing or the like. In this case, if the routine waits for the injection timing to become identical with the target timing, the engine will not start. Prevention of fuel injection is therefore stopped when the cranking number has reached Nc, fuel injection is begun and the engine is started. The same is true when the injection timing is not identical to the target timing due to a problem in the system controlling the fuel injection timing. If the engine is started by allowing fuel injection, the vehicle can at least be set in motion.

When the cranking number does not reach the predetermined value Nc, fuel injection stop is maintained in the step S202, and fuel injection timing is advanced.

To make it easy to advance the injection timing in a short time, the injection timing adjustment mechanism preferably has the construction shown in FIG. 10.

In the mechanism shown in FIG. 10, one end of a spring 52 pushing a timer piston 51 in the retarding direction is connected to a moving part 53A of a solenoid 53. The solenoid 53 is connected to a battery 55 via a power transistor 54. The power transistor 54 is energized and controlled by a control unit 56, and it energizes the solenoid 53 by an ON signal. The moving part 53A therefore moves toward the solenoid 53 against the force of a return spring 53B, and the initial load exerted by the spring 52 on the timer piston 51 is decreased.

The injection timing is determined according to the pressure balance of the advancing pressure chamber 24 which is under a high pressure led from the pump chamber 7, and the spring 52. If the pressure of the advancing pressure chamber 24 is invariant, the timer piston is shifted in the advancing direction by decreasing the initial load of the spring 52. This injection timing adjustment mechanism therefore makes it possible to shorten the startup time, and the injection timing can be advanced without fail even when the fuel has waxed under very low temperature conditions.

FIGS. 11A–11C show a fourth embodiment of this invention.

This embodiment relates to a fuel injection timing adjustment mechanism that does not use the spring 23.

This mechanism is provided with a servovalve 31 which rotates coaxially with the timer piston 8 according to the energization of the solenoid 32. When the action has stopped, as shown in FIG. 11A, the servovalve 31 keeps both the advancing pressure chamber 24 and retardation pressure chamber 25 closed, and displacement of the timer piston 8 is prevented.

In the retarding action, as shown in FIG. 11B, the servovalve 31 is rotated so that the pump chamber 7 and retarding pressure chamber 25 are connected via an oil passage 33 formed inside the timer piston 8, and a low pressure chamber 28 is connected with the advancing pressure chamber 24 via oil passages 34, 35 formed inside the timer piston 8. Due to this operation, high pressure working oil in the pump chamber 7 flows into the retarding pressure chamber 25 and working oil in the advancing pressure chamber 24 flows into the low pressure chamber 28. The timer piston 8 is therefore shifted in the retarding direction.

In the advancing action, as shown in FIG. 11C, the servovalve 31 is rotated so that the pump chamber 7 and advancing pressure chamber 24 are connected via the oil passage 34, and the low pressure chamber 28 is connected with the retarding pressure chamber 25 via the off passages 40, 35. Due to this operation, high pressure working oil in the pump chamber 7 flows into the advancing pressure chamber 24 and working off in the retarding pressure chamber 25 flows into the low pressure chamber 28. The timer piston 8 is therefore shifted in the advancing direction.

As springs are not used in this construction, there is no resistance to piston displacement in the advancing action, hence the advance correction is extremely easy to apply during a low temperature startup and the injection timing control response during startup improves. Moreover, as the maximum advance amount can be set large, the startup time can be shortened and startup is possible at very low temperature. Still further, as set range of injection timing is wider, there is no limitation on the post startup injection timing retarding amount which is applied due to the advancing amount required for startup, there is a greater degree of freedom in the design of the engine combustion system, and low engine compression ratios are possible.

FIGS. 12–16G show a fifth embodiment of this invention.

According to this embodiment, a plate 39 is attached to the face cam 36 connected to the plunger 2, a cam lift sensor 38 being provided to detect the start of cam lift when this plate 39 passes by.

A crank angle sensor is provided which outputs a reference crank angle signal at a predetermined engine rotation angle (e.g. 50° BTDC).

A time difference $\Delta T_{PC}$(msec) is calculated between these two signal outputs shown in FIGS. 13A–13C, and the pump feed start timing (BTDC) is found from this time difference $\Delta T_{PC}$(msec), an offset amount CA from TDC of a target feed start timing and the engine rotation speed Ne using the following relation:

$$\text{Pump feed start timing}(BTDC) = \frac{Ne(rpm) \cdot 360° \cdot \Delta T_{PC}(msec)}{60(sec) \cdot 1000} + CA$$

The position of the timer piston 8 is controlled via the timing control valve 9 so that this pump feed start timing is identical to the target feed start timing.

Figure 14:
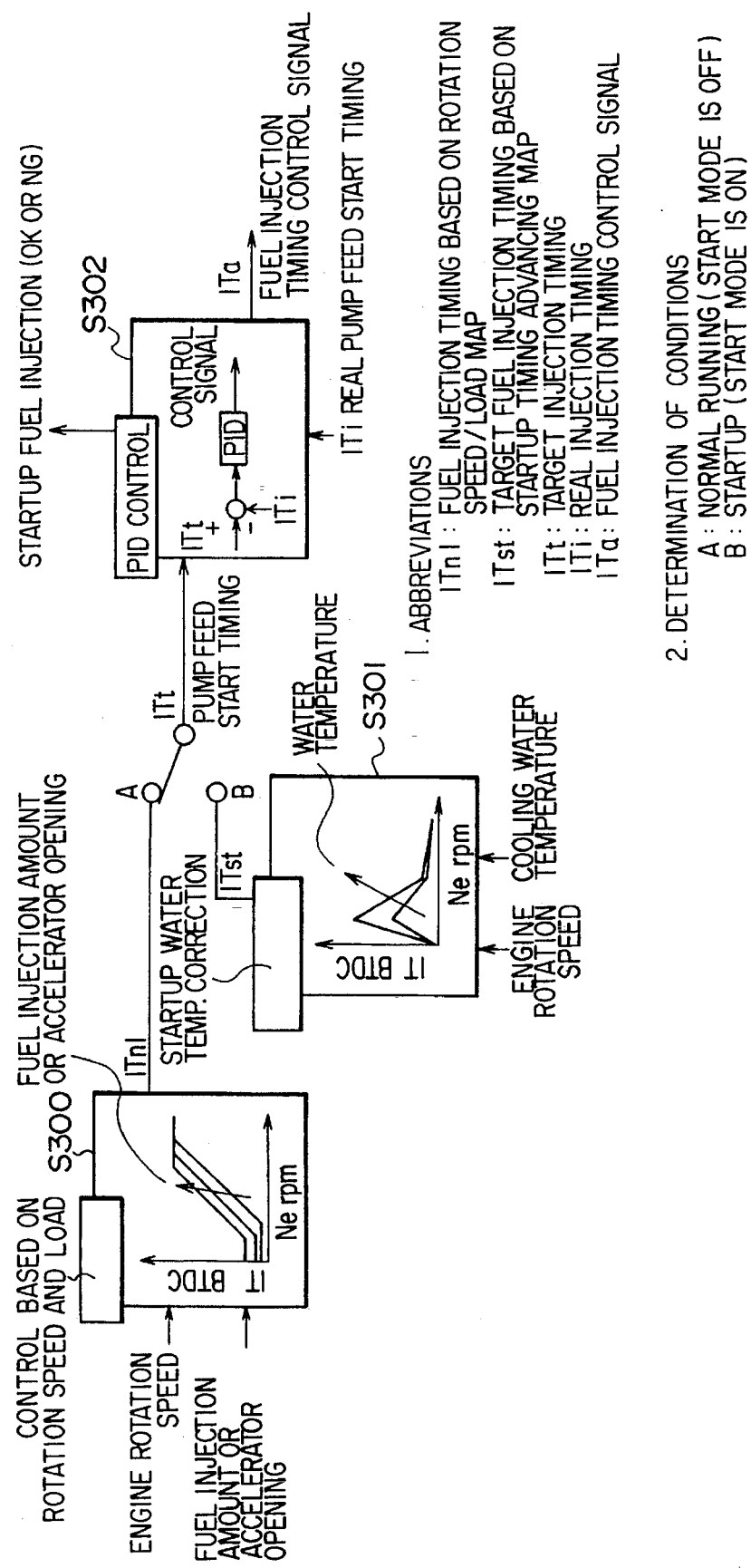
FIG. 14 is a block diagram showing a control process of a fuel injection timing according to the fifth embodiment of this invention.

The control of fuel injection timing follows the block diagram shown in FIG. 14, i.e., under normal running conditions, the injection timing is determined according the engine speed Ne and the fuel injection timing set according to the aforesaid engine load (step S300).

During engine startup, the fuel injection timing is determined according to the startup injection timing advance characteristics set according to the engine speed Ne and water temperature Tw (step S301).

The target injection timing and the pump feed start timing detected from signals output by the cam lift sensor 38 and the crank angle sensor are compared, and an actuator command signal specifying a timing control valve duty ratio is output by PID processing (step S302).

According to the aforesaid first—fourth embodiments, the displacement position of the timer piston 8 detected by the piston position sensor 30 was based on the injection timing control. In this case, if there is an error in the installation angle of the injection pump 1 in the engine, i.e. the pump set angle $\theta_0$, it will affect the injection timing control. According to this embodiment, however, this error is corrected by controlling the injection timing based on the time difference $\Delta T_{PC}$(msec) between the signal outputs of the cam lift signal and reference crank angle signal.

Figure 15A:
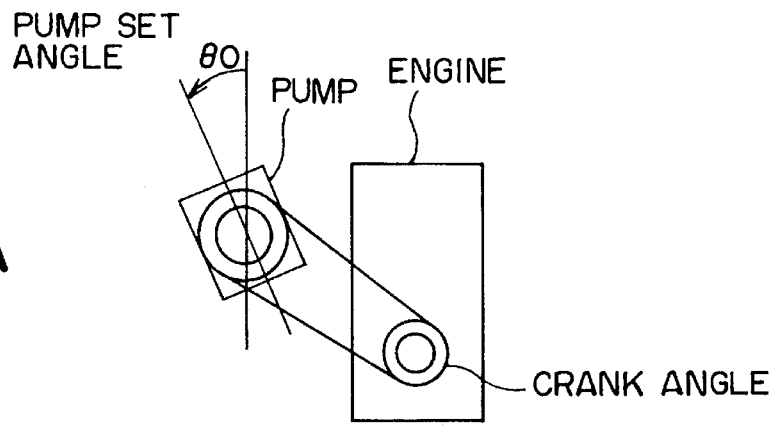
FIGS. 15A–15G are diagrams describing the time difference $\Delta T_{PC}$(msec) when there is no error in the pump set angle $\theta_0$ between the fifth embodiment and the first—fourth embodiments of this invention.
Figure 15B:
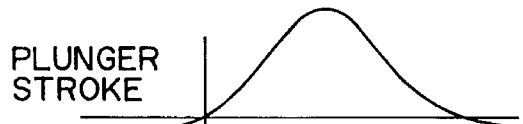
Figure 15C:
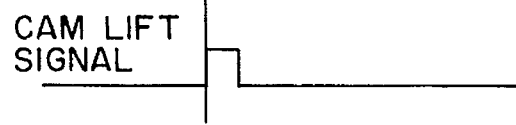
Figure 15D:
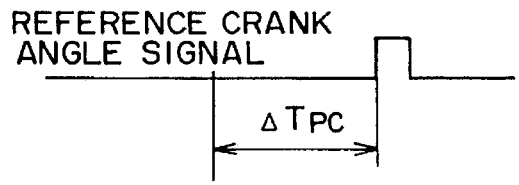
Figure 15E:
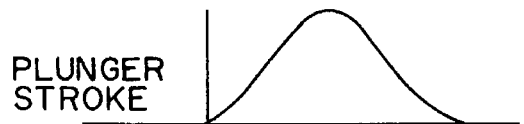
Figure 15F:
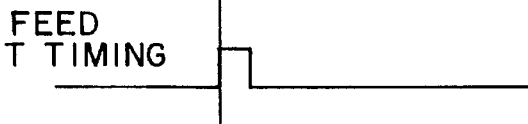
Figure 15G:
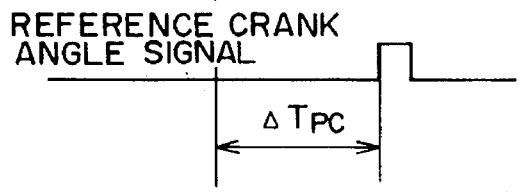

For example, in the state shown in FIG. 15A, the error $\Delta \theta$ in the pump set angle $\theta_0$ is 0. In this case, the result is the same for the injection timing control of this embodiment shown in FIGS. 15B–15D, and the injection timing control based on displacement position of the timer piston 8 shown in FIGS. 15E–15G.

Figure 16A:
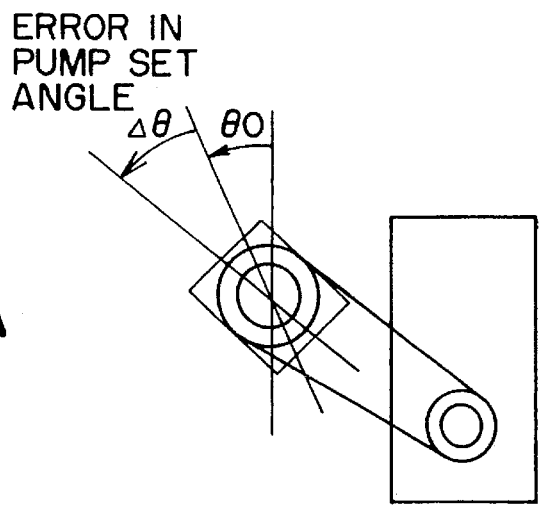
FIGS. 16A–16G are similar to FIGS. 15A–15G, but showing the time difference $\Delta T_{PC}$(msec) when there is an error in the pump set angle $\theta_0$.
Figure 16B:
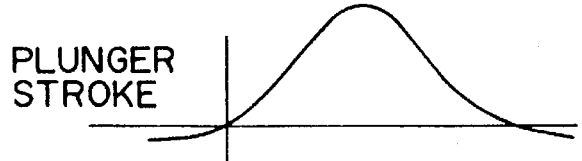
Figure 16C:
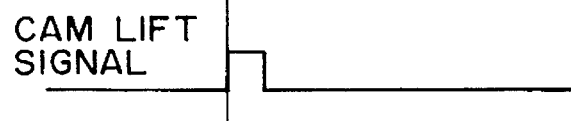
Figure 16D:
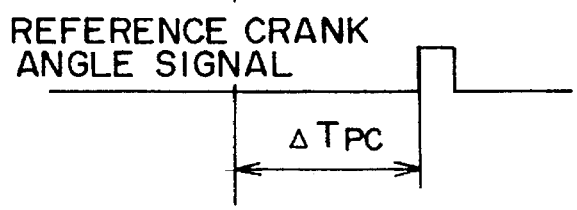
Figure 16E:
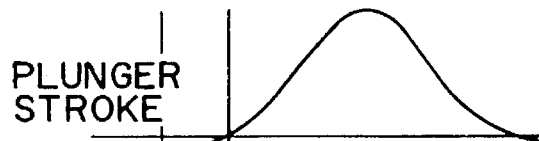
Figure 16F:
Figure 16G:
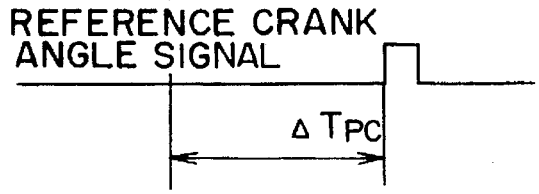
Figure 17:
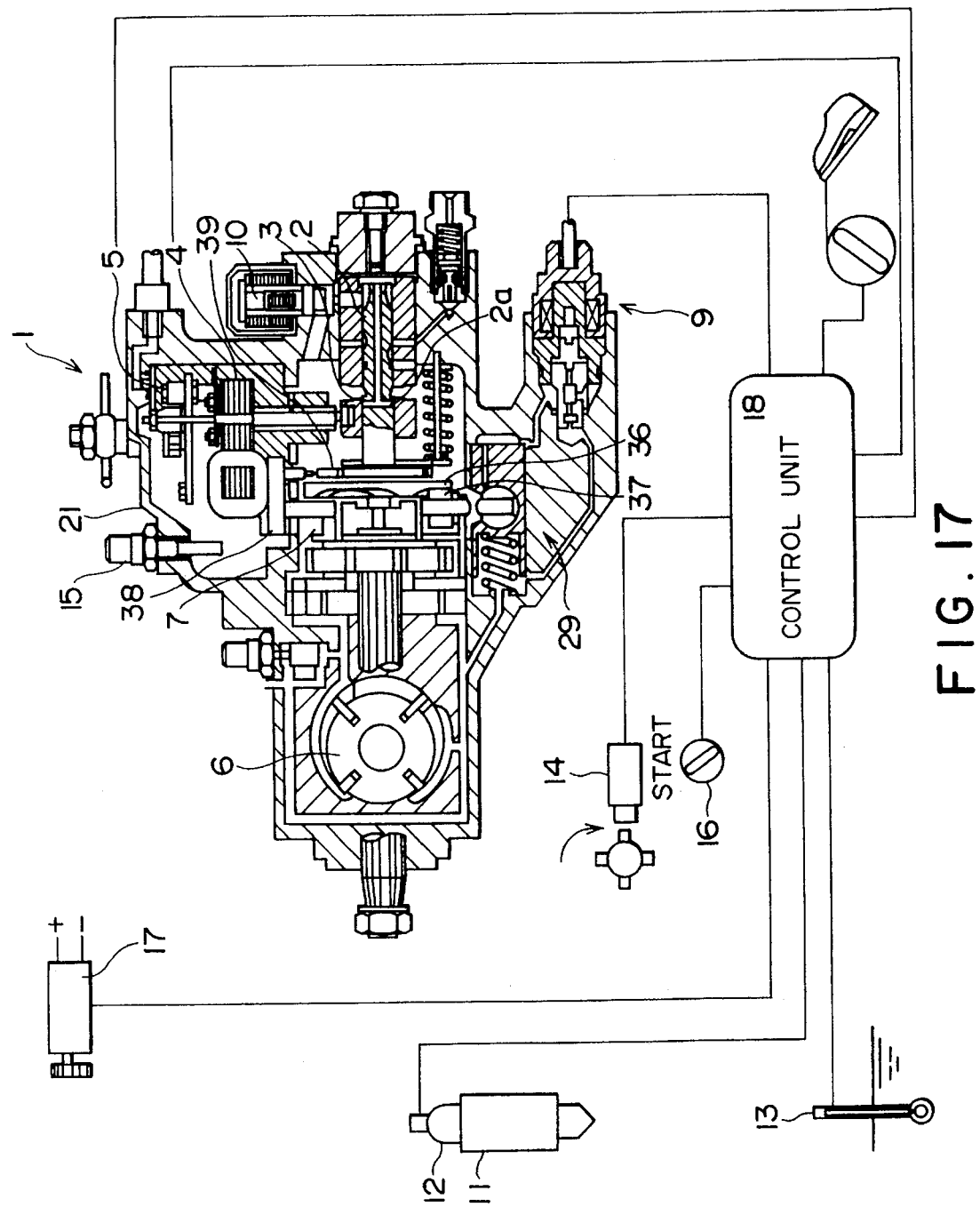
FIG. 17 is similar to FIG. 1, but showing a sixth embodiment of this invention.

However, when the error $\Delta \theta$ in the pump set angle $\theta_0$ is not 0, if injection timing is controlled based on the time difference $\Delta T_{PC}$(msec) between the signal outputs of the cam lift signal and reference crank angle signal, effectively the same result as when the error $\Delta \theta$ is 0 is obtained as shown in FIGS. 16B–16D. On the other hand, when injection timing is controlled based on the displacement position of the timer piston 8, the injection timing is shifted by an amount corresponding to $\Delta \theta$ as shown in FIGS. 16E–16G.

The precision of injection timing control is therefore improved by controlling injection timing based on the time difference $\Delta T_{PC}$(msec) between the signal outputs of the cam lift signal and reference crank angle signal.

FIGS. 17–19E show a sixth embodiment of this invention.

According to this embodiment, a needle valve lift sensor 12 is provided for detecting the lift of a needle valve of an injection nozzle 11.

Here, the injection timing is controlled so that, when a fuel injection equal to or greater than a predetermined amount is performed, a lift timing of the needle valve corresponding to a target injection timing determined according to the engine running conditions is identical to the lift timing of the needle valve detected by the needle valve lift sensor 12.

On the other hand, when there is no injection or the fuel injection amount is less than a predetermined amount, injection timing is controlled based on the time difference $\Delta T_{PC}$(msec) between the signal outputs of the cam lift signal and reference crank angle signal of the aforesaid fifth embodiment.

More specifically, when the fuel injection amount is equal to or greater than a predetermined amount, a difference $\Delta T_{NC}$ between a dynamic injection timing detected by the needle valve lift sensor 12 and the reference crank angle signal is calculated. A dynamic injection timing (BTDC) is then found from the following relation:

Dynamic injection timing(BTDC) =

$$\frac{Ne(rpm) \cdot 360° \cdot \Delta T_{NC}(msec)}{60(sec) \cdot 1000} + CA$$

Figure 18:
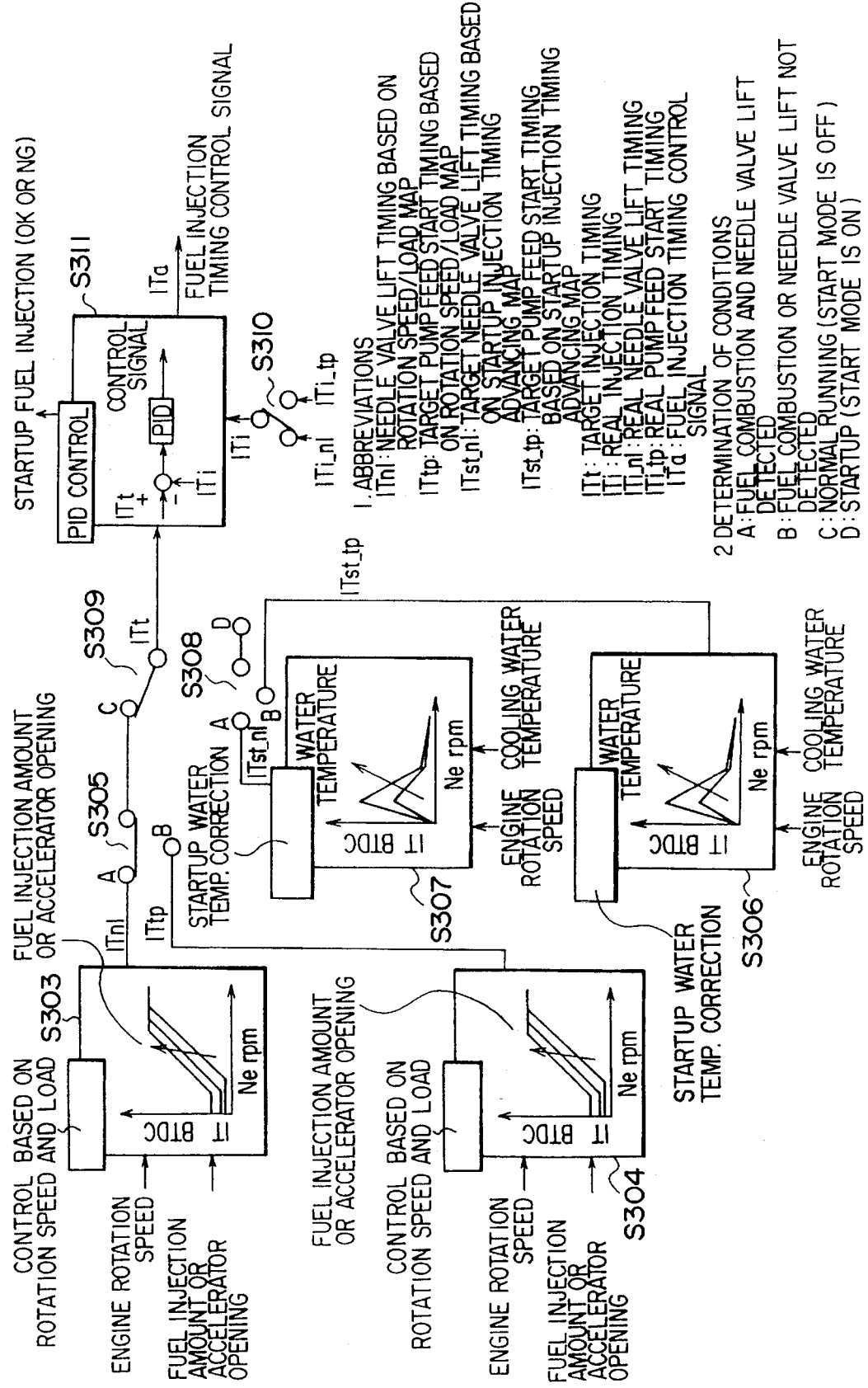
FIG. 18 is a block diagram showing a control process of a fuel injection timing according to the sixth embodiment of this invention.

In the control of fuel injection timing, under normal running conditions, a target needle valve lift timing ITn1 is determined from speed/load characteristics depending on the engine speed Ne and engine load, as shown in FIG. 18 (S303).

When no fuel is injected, a pump feed start timing ITip is determined from speed/load characteristics of the engine speed Ne and engine load, as shown in a step 304.

The change-over between ITn1 and ITip is determined by determining whether or not there has been a full combustion (Ne>predetermined value and the start mode is OFF), and by determining whether or not a needle valve lift signal is detected (S305).

When no fuel is injected during engine startup, a pump feed start timing ITst_tp is determined based on startup injection timing advance characteristics set according to the engine speed Ne and water temperature Tw (step S306).

After fuel injection during engine startup, a target needle valve lift timing ITst_n1 is determined based on startup injection timing advance characteristics set according to the engine speed Ne and water temperature Tw (step S307).

The change-over between ITst_tp and ITst_n1 is determined by determining whether or not there has been a full combustion (Ne>predetermined value and the start mode is OFF), and by determining whether or not a needle valve lift signal is detected (step S308).

The target injection timing and a real injection timing measured by the cam lift sensor 38 or the needle valve lift sensor 12 are compared, and an actuator command signal specifying a timing control valve duty ratio is output by PID processing (S311).

According to the aforesaid first—fifth embodiments, the injection timing is controlled by the pump feed start timing. However, slight errors may occur in the timing at which the fuel injection pump 1 actually begins to feed fuel and the timing at which fuel is injected from the nozzle 11 due to fuel properties, fuel temperature or other factors, as shown in FIGS. 19A–19E. According to this embodiment, under normal running conditions when the fuel injection amount is equal to or greater than a predetermined amount, the injection timing is controlled based on a dynamic injection timing as described hereintofore. Errors in the injection period are thereby corrected, and exhaust, performance and drivability under normal running conditions are improved.

Figure 20:
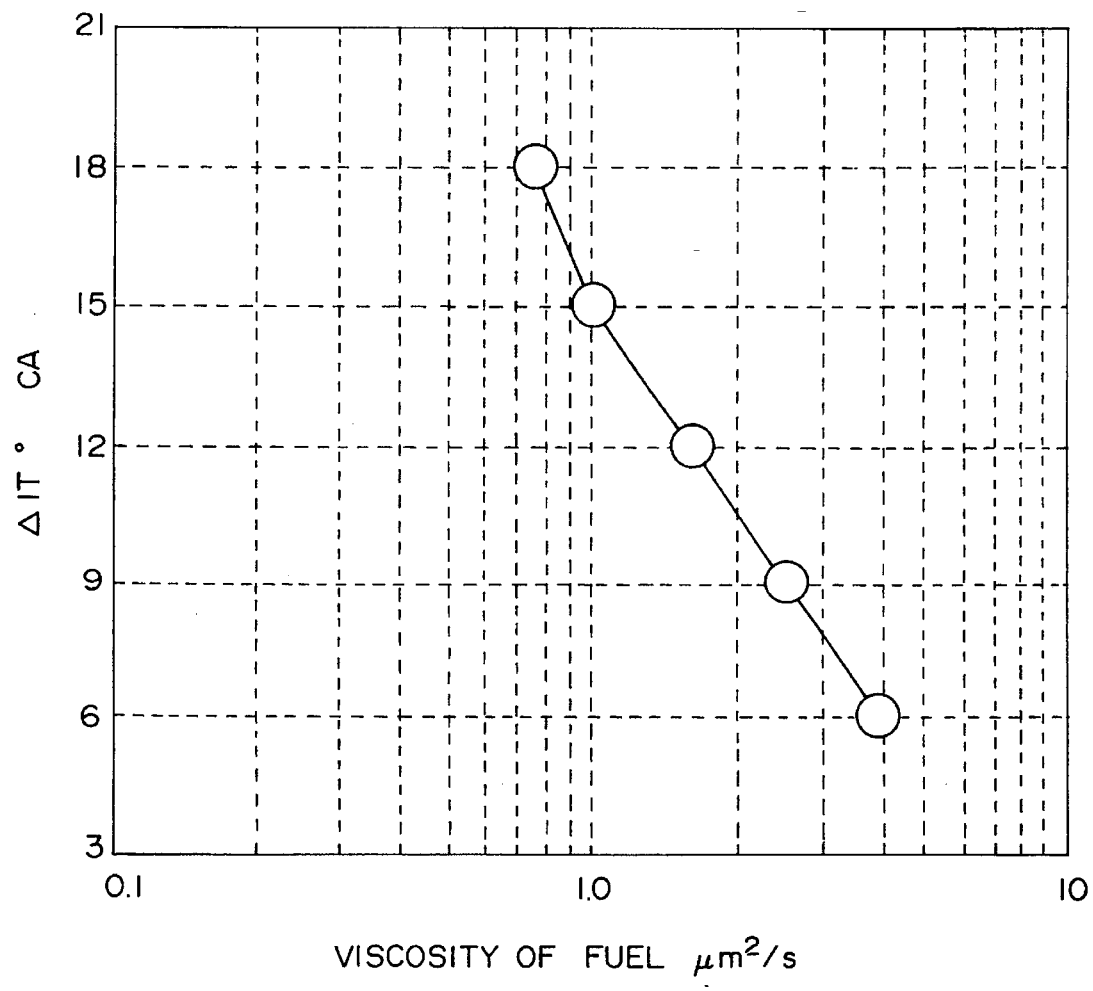
FIG. 20 is a graph showing the relation between an injection delay time $\Delta IT$ and fuel viscosity according to a seventh embodiment of this invention.
Figure 21A:
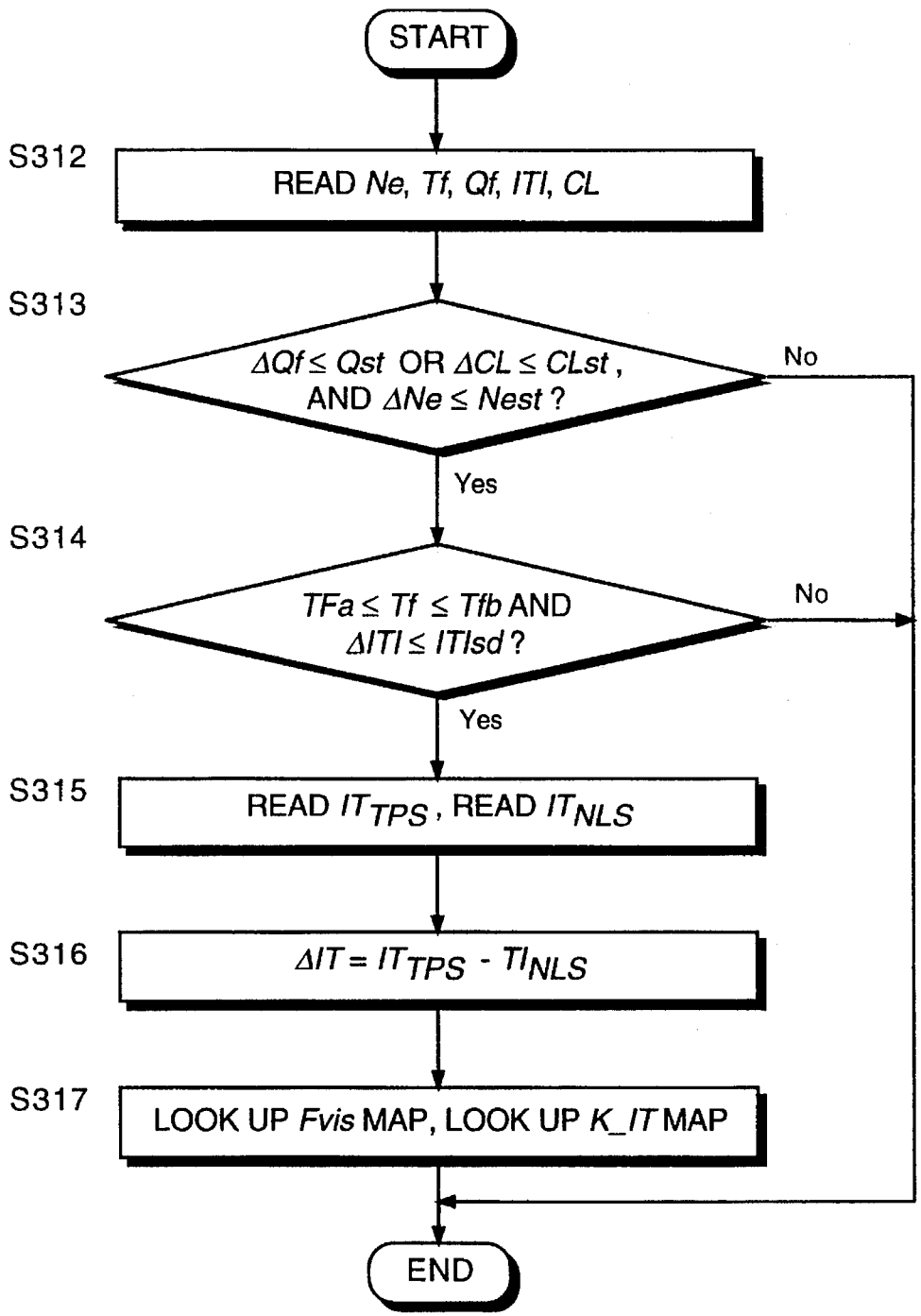
FIG. 21A–21C are a flowchart describing a fuel property determining process and graphs showing maps used in this process according to the seventh embodiment of this invention.
Figure 21B:
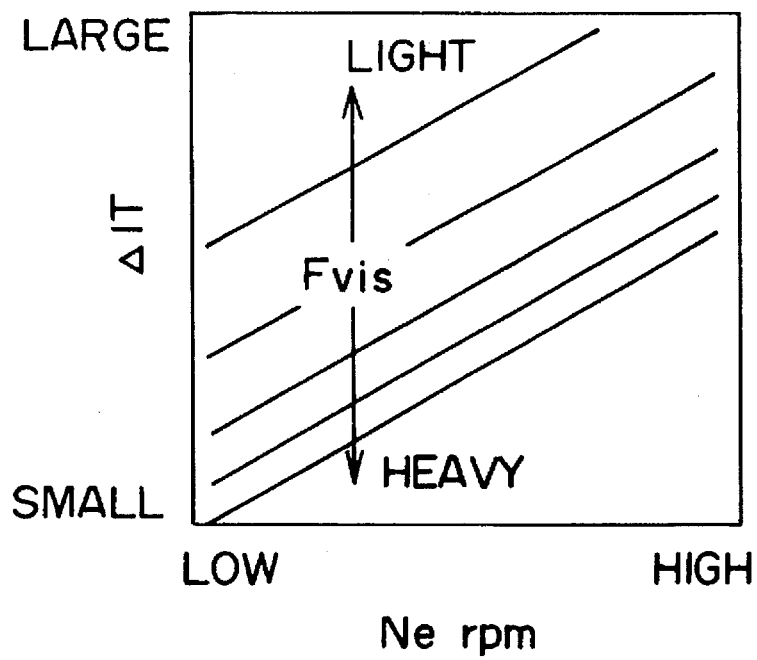
Figure 21C:
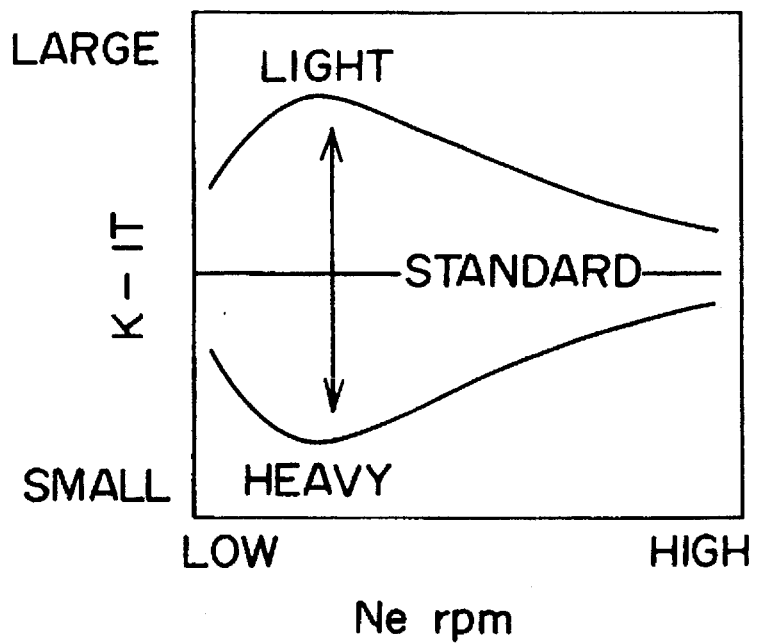
Figure 22:
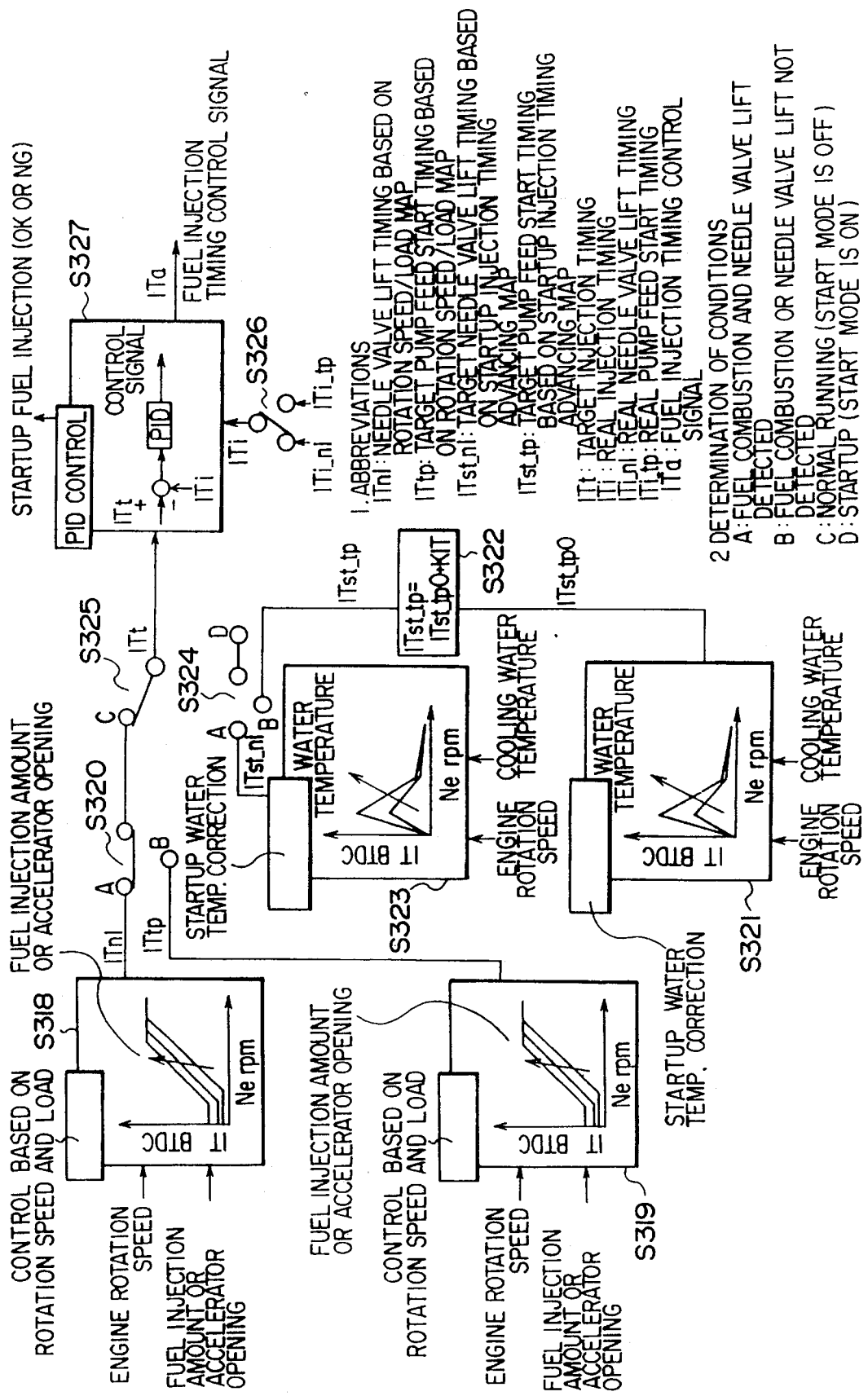
FIG. 22 is a block diagram showing a control process of a fuel injection timing according to the seventh embodiment of this invention.

FIGS. 20–22 show a seventh embodiment of this invention.

According to this embodiment, the injection timing is adjusted by the timer piston 8, and detection of the injection timing is performed by the piston position sensor 30 or cam lift sensor 38.

There is a slight time lag from when the fuel injection pump 1 begins feeding fuel to when the needle valve of the nozzle 11 reaches the pressure at which lift occurs. Let this time lag be an injection delay time ΔIT. If fuel properties are constant, the injection delay time ΔIT is determined by the dimensions of the injection system. The dimensions include the nozzle valve opening pressure, plunger diameter, length of piping from the pump to the nozzle, and the lift characteristics of the cam. When these parameters do not change, therefore, the fuel properties can be estimated from the injection delay time ΔIT as shown for example by FIG. 20.

Also with light fuel, there are more leaks from sliding parts than with heavy fuel, and the pressure rise of the injection valve tends to be delayed. In other words, the dynamic injection timing is retarded for the same feed start According to this embodiment, therefore, the fuel properties are determined from the injection delay time ΔIT during normal running, a pump feed start timing correction value is learnt based on the fuel properties, and this is applied to control of fuel injection timing on the next startup.

FIG. 21A shows a fuel property determining process performed under this control.

First, in a step S312, various engine running conditions are read. In steps S313, S314, it is determined whether or not these running conditions satisfy predetermined conditions. When all these conditions are satisfied, the injection delay time ΔIT which is the difference between the pump feed start timing $IT_{TPS}$ and the needle valve lift timing $IT_{NLS}$, is calculated (steps S315, S316). Based on ΔIT, a fuel property determining value Fvis is searched from a map shown in FIG. 21B which is previously stored in the control unit 18. Based on this value, a feed start timing correction value K_IT is also found from a map shown in FIG. 21C which is previously stored in the control unit 18 (step S3 17).

The fuel injection timing is controlled according to the block diagram shown in FIG. 22.

More specifically, during normal running conditions, the target needle valve lift timing ITn1 is determined from speed/load characteristics depending on the engine speed Ne and engine load (step S318).

When no fuel is injected, a pump feed start timing ITtp is determined from speed/load characteristics depending on the engine speed Ne and engine load (step S319).

The change-over between ITn1 and ITtp is determined by determining whether there has been a full combustion (Ne>predetermined value and the start mode is OFF), and by determining whether or not a needle valve lift signal is detected (step S320).

During engine startup, when no fuel is injected, the pump feed start timing ITst_tp0 is determined based on startup injection timing advance characteristics set according to the engine speed Ne and water temperature Tw (step S306).

In this case, the pump feed start timing is calculated from a stored fuel property correction value by the following equation (step S322):

$$ITst\_tp=ITst\_tp0+K\_IT$$

During engine startup, after fuel injection, a target needle valve lift timing ITst_n1 is determined based on startup injection timing advance characteristics set according to the engine speed Ne and water temperature Tw (steps S323, S324).

The change-over between ITst_tp and ITst_n1 is determined by determining whether there has been a full explosion (Ne>predetermined value and the start mode is OFF), and by determining whether or not a needle valve lift signal is detected (step S325).

The target injection timing and the pump feed start timing detected from signals output by the cam lift sensor 38 and the crank angle sensor are compared, and an actuator command signal specifying a timing control valve duty ratio is output by PID processing (S326, S327).

This embodiment determines fuel properties during normal running conditions, predicts the variation of a dynamic injection timing and pump feed start timing due to fuel properties, and reflects the prediction results in fuel feed start timing control on the next startup. The startup time can therefore be further shortened.

Accordingly, although this invention has been shown and described in terms of the preferred embodiment thereof, it is not to be considered as limited by any of the perhaps quite fortuitous details of said embodiment, or of the drawings, but only by the terms of the appended claims, which follow.

We claim:

1. A startup controller for use with a diesel engine, said engine having cranking means to start said engine and means for injecting fuel into a combustion chamber of said engine, comprising:

means for detecting an engine running condition, means for determining a fuel injection target timing of said injecting means based on the engine running condition, means for controlling a fuel injection timing of said fuel injection means to said fuel injection target timing, means for detecting an injecting action of said injecting means, and means for preventing fuel injection by said injecting means after engine cranking by cranking means until the detected timing of said injecting action becomes identical to said fuel injection target timing.

2. A startup controller as defined in claim 1, wherein said injecting means comprises a pump for pressurizing fuel, said pump comprises a pressurizing chamber for pressurizing fuel and a cut-off valve which blocks a fuel supply passage to said pressurizing chamber, and said preventing means comprises means for shutting said blocking valve.

3. A startup controller as defined in claim 1, wherein said injecting means comprises a pump for pressurizing fuel, said pump comprises a pressurizing chamber for pressurizing fuel and means for relieving the pressure of said pressurizing chamber, and said preventing means comprises means for operating said relieving means to relieve the pressure of said pressurizing chamber.

4. A startup controller as defined in claim 1, wherein said preventing means comprises means for permitting fuel injection by said injection means when said fuel injection timing does not become identical to said target timing within a predetermined period.

5. A startup controller as defined in claim 1, wherein said control means comprises means for advancing an injection timing during the period when fuel injection is prevented by said preventing means.

6. A startup controller as defined in claim 5, wherein said advancing means comprises two oil chambers and a control member which displaces according to a pressure balance between said oil chambers, and said injection timing is advanced according to the position of said control member.

7. A startup controller as defined in claim 6, wherein injecting action detecting means comprises means for detecting the position of said control member.

8. A startup controller as defined in claim 7, wherein said injecting means comprises a fuel injection valve which lifts according to a fuel pressure, said injection action detecting means further comprises means for detecting a lift of said fuel injection valve, and said control means controls the pressure of said off chambers such that the lift timing of said fuel injection valve is identical to a target lift timing of said fuel injection valve found from said target injection timing when a fuel injection amount is equal to or greater than a predetermined value.

9. A startup controller as defined in claim 8, wherein said control means comprises means for calculating a difference between a lift detection timing of said fuel injection valve and said injecting action detecting timing when said fuel injection amount is equal to or greater than a predetermined value, and correcting an advance amount of said injection timing due to said advancing means based on said difference.

10. A startup controller as defined in claim 6, wherein said injecting means comprises a fuel injection pump which pressurizes fuel by a lift of a cam in synchronism with a rotation of said engine, and said injecting action detecting means comprises means for detecting the lift of said cam.

11. A startup controller as defined in claim 10, wherein said injecting means comprises a fuel injection valve which lifts according to a fuel pressure, said injecting action detecting means further comprises means for detecting a lift of said fuel injection valve, and said control means controls the position of said control member such that the lift timing of said fuel injection valve is identical to a target lift timing of said fuel injection valve found from said target injection timing when said fuel injection amount is equal to or greater than a predetermined value.

12. A startup controller as defined in claim 11, wherein said control means comprises means for calculating a difference between the lift detection timing of said fuel injection valve and the lift detection timing of said cam when said fuel injection amount is equal to or greater than a predetermined amount, and corrects the advance amount of said injection timing due to said advancing means based on said difference.

* * * * *